(12) United States Patent
Yuan

(10) Patent No.: US 8,182,772 B2
(45) Date of Patent: May 22, 2012

(54) RADIAL FLOW CONTINUOUS REACTION/REGENERATION APPARATUS

(76) Inventor: Leon Yuan, Taipei (TW)

( * ) Notice: Subject to any disclaimer, the term of this patent is extended or adjusted under 35 U.S.C. 154(b) by 173 days.

(21) Appl. No.: 12/790,941

(22) Filed: May 31, 2010

(65) Prior Publication Data

US 2010/0329949 A1     Dec. 30, 2010

Related U.S. Application Data

(60) Provisional application No. 61/269,481, filed on Jun. 26, 2009.

(51) Int. Cl.
*B01J 8/02* (2006.01)
*B01J 8/04* (2006.01)
*B01D 53/04* (2006.01)

(52) U.S. Cl. ........ 422/637; 422/218; 422/223; 422/178; 422/181; 96/124; 96/130; 96/131; 96/143

(58) Field of Classification Search .................. 422/176, 422/178, 181, 636, 637, 218, 220, 223; 96/124, 96/130, 143–145, 115, 116, 125, 131
See application file for complete search history.

(56) References Cited

U.S. PATENT DOCUMENTS

| 4,863,497 A | * | 9/1989 | Grenier et al. | 96/123 |
| 5,133,784 A | * | 7/1992 | Boudet et al. | 95/100 |

FOREIGN PATENT DOCUMENTS

JP    63134026 A  *  6/1988

OTHER PUBLICATIONS

English Abstract for JP 63-134026 A (Jun. 1988).*

* cited by examiner

*Primary Examiner* — Jennifer A Leung

(57) ABSTRACT

This specification discloses a radial flow continuous reaction/regeneration apparatus. Through employing a rotary device to individually and annularly distributing process fluid and regeneration fluid into a stationary segmented reaction/regeneration box and receiving effluents individually and annularly from the same stationary reaction/regeneration box, the mentioned radial flow continuous reaction/regeneration apparatus can be operated continuously and efficiently without the need for shutting down for regeneration. This radial flow continuous reaction/regeneration apparatus is not only used to separate components by adsorption, such as dehumidification, but also is used in chemical processes to carry out catalytic reaction, regenerate catalyst and used as filtration device to trap particles by changing the filler in the stationary reaction/regeneration box.

28 Claims, 13 Drawing Sheets

RADIAL FLOW CONTINUOUS REACTION/REGENERATION APPARATUS

BACKGROUND OF THE INVENTION

1. Field of the Invention

This invention is related to a reaction/regeneration apparatus, and particularly is related to continuous separation of contaminants and regeneration of adsorbent or is related to the carrying out of chemical reactions and the regenerating of catalyst continuously in the stationary radial flow beds.

2. Description of the Prior Art

The term reaction herein includes both the physical and chemical adsorption and chemical reaction processes. The adsorption process is widely used for the component separation in many industries. The adsorption is typically a batch type process. The desirable product can only be produced part of the time and the adsorbent bed needs to be regenerated. To provide a continuous flow of desirable product, it is often necessary to use multiple vertical vessels having fluid flows axially through the vertical beds. A series of the steps, including adsorption, purging and regeneration are carried out in each vessel. Fluid with non-adsorbed components is produced during the adsorption step and the components adsorbed are recovered during desorption or regeneration step. The regeneration is typically achieved by either process pressure reduction in pressure swing adsorption (PSA) or by raising process temperature in temperature swing adsorption (TSA). Depending on if a PSA or TSA process is used, additional steps such as equalization or cooling are needed.

To properly direct the flow to and from each vessel during the cycling of steps, conventionally, it is necessary that multiple lines are used in a multi-vessel adsorption system with valves open and close at different times. The valves can be cycled as short as every minute in a PSA system which can lead to high wear of valves. Alternately, a rotary flow distribution assembly or valve is used in U.S. Pat. Nos. 4,935,464, 5,268,021, 5,366,541, 5,779,771, 5,820,656, 6,457,485. A typical rotary valve includes a valve port disk and a rotary valve. The rotary valve is rotated relative to stationary valve port disk so that the openings of the rotary valve register with the holes in the valve port disk. This enables appropriate fluids to flow to and from the different vessels during the various steps of the cycle. Different inventors invented different rotary valve designs and multiple vessels are used. With the rotary valve, many of the automatic valves in the conventional multi-vessels adsorption system can be eliminated. However, multiple vessels with many connecting lines between the valve and vessels are still needed. U.S. Pat. No. 5,779,771 uses a rotary flow distributor assembly to distribute two feeds, namely, decontamination and regeneration fluids, to several individual container vessels. The rotary flow distributor disclosed can distribute only two fluids alternately which limits the applicability of the assembly. Due to the limitation of only two feeds and no purging fluid can be used, the mixing of the two fluids in the containers or vessels can not be avoided during the switching of fluid in the vessel. Instead of using a rotary valve to change the flow, U.S. Pat. Nos. 4,589,892, 5,464,468, 5,441,559, 6,447,583 and 6,783,738 rotate the packed solid adsorbent beds. The adsorption and regeneration are performed sequentially in the rotating adsorbent beds with the stationary inlet and outlet ports which are connected to the fixed gas distribution chambers. The rotation of the heavy adsorbent beds can have high torque requirement and require a large motor.

As shown in the previous references, most of the efforts in the prior art are made to improve the rotary valve design or to improve the rotating adsorbent beds. The rotary valve still requires many inlet outlet lines to communicate feeds and effluents with the different vessels or adsorbent beds. The rotating adsorbent bed needs high torque and requires a large motor. Most of the processes are typically operated in steps rather than continuously. The adsorption performance in discrete time step is similar to the performance of the batch operation. The performance declines and the adsorbate in the product increases when the adsorbent reaches the adsorbate breakthrough point. For the temperature swing adsorption, the process effluent temperatures can cycle with time. The longitudinal flow path of the cylindrical adsorbent bed is used typically in most systems and is known to have higher pressure losses than a radial flow system. U.S. Pat. Nos. 5,133,784, 5,597,489, 6,086,659, and US 2006/0236867 and WO 86/06056 discuss the radial flow adsorption in the multiple vessel or rotating bed. U.S. Pat. Nos. 6,751,964 and 7,338,548 disclose the state of art air desiccant dehumidifier employing a parallel passage way rotating desiccant wheel rotor. The rotating desiccant wheel required the special manufacturing technique to impregnate the active desiccant to alternate layers of flat and corrugated sheets.

The chemical reaction processes are used to convert the low value reactants into high value useful products. The fixed bed reactor loaded with catalyst to promote the reactions is widely used in the chemical, petrochemical and petroleum industries. The catalyst used in the reactor can become deactivated for one or more reasons. The most common reason for the deactivation is the accumulation of coke on the catalyst. To restore the performance of the deactivating catalyst, careful burning of the accumulated coke is frequently performed. The catalyst is reactivated by contacting of the coke containing catalyst at high temperature with an oxygen containing gas. The coke combustion is carried out in the same fixed bed periodically or the catalyst with coke in the reactor is transferred from the reactor to a regenerator to burn off the coke. U.S. Pat. No. 3,652,231 shows a regeneration apparatus for a continuous catalyst regeneration process. This regeneration apparatus is used in the catalytic reforming of hydrocarbons with a moving bed catalyst. U.S. Pat. Nos. 3,647,680 and 3,692,496 also deal with regeneration of reforming catalyst. To remove the coke on the deactivated catalyst, the reactor must be shut down periodically for the fixed bed reactor system or an additional regenerator system is needed for the moving bed system.

Therefore it is an object of this invention to provide a reaction apparatus capable of performing adsorption or chemical reaction and regeneration continuously in a single vessel without the need to shut down the process for regeneration.

SUMMARY OF THE INVENTION

According to the above, the present invention provides a radial flow continuous reaction/regeneration apparatus for use in the thermal swing, pressure swing processes and chemical reaction processes, wherein the reacting and regenerating are continuously in different parts of the radial flow continuous reaction/regeneration apparatus.

It is a first object of the invention to provide a continuous reaction/regeneration apparatus to eliminate the need of multiple rotating vessels.

It is a second object of the invention to provide a continuous reaction/regeneration apparatus to eliminate the need of using multiple control valves between vessels, feeds and product destinations.

It is a third object of the invention to provide a continuous reaction/regeneration apparatus to reduce the differential pressure across the packed solid bed to decrease the power consumption.

It is the fourth object of the invention to provide a continuous reaction/regeneration apparatus which can be operated in a stepwise manner but can approach continuous if needed.

It is the fifth object of the invention to provide a continuous reaction/regeneration apparatus that eliminates the moving bed continuous catalyst regeneration and transfer system.

It is the sixth object of the invention to provide an apparatus that can accommodate more than two feed and two effluent streams to/from the continuous reaction/regeneration apparatus simultaneously. Adding additional feed streams to purge between the process and regeneration fluids can preheat or precool the filler bed and prevent the mixing of the process and regeneration fluid in the vessel. The process performance is improved as a result.

To achieve the above objects of this invention, the mentioned radial flow continuous reaction/regeneration apparatus comprises a minimum of one stationary inlet and outlet pipes, a rotary device with flow distribution channels, and a stationary reaction/regeneration box with separated flow distribution portions, annular fan sections and outer annular fan fluid transfer segments. Furthermore, the flow distribution channels in the rotary device comprises at least one rotating flow channel and face plate openings with or without rotating flow distribution box as illustrated in the examples later. FIG. 1 gives the block flow diagram of a typical counter current flow system. The process fluids include the feed 1, feed 2, and purge feed into the system through the flow channels in the stationary pipes. The flow distribution channels in the rotary device receive the feeds from the stationary pipes and selectively distribute the feeds through the end openings of the flow distribution channels into the segmented flow distribution portion. The segmented flow distribution portion directs the feeds to the corresponding segmented annular fan beds subsequently. The effluents from the annular fan bed segments flows into the outer annular fan fluid transfer segments and continue in reverse of the prior flow sequence to leave the lower section of the annular fan beds. Depends on the design of the partitioning plates in the flow distribution area, feeds can go through more than one set of annular fan bed segments before exit the apparatus. With the multiple flow channels in the stationary pipes and in the rotary device, the stationary flow distribution segments, the separated segmented annular fan beds with filler and outer annular fan fluid transfer segments, several different processes such as adsorption/chemical reactions, purging and regeneration can occur in different filler bed segments simultaneously as there can be different fluid in each flow channel. As the rotary device rotates though 360 degrees in equal angular step and steps through one segment at a time, the feed in each rotating flow distribution channel can be directed toward each annular fan filler bed segment in sequence according to the flow distribution channel end opening position.

This radial flow continuous reaction/regeneration system operates typically in a stepwise manner and can be operated continuously if desired. When a stepwise operation mode with many steps and many annular fan segments or a continuous operation mode is used, the product stream temperature and purity are very stable. The radial flow packed bed is used as opposed to the conventional longitudinal flow packed bed to reduce the pressure losses. Instead of rotating the packed filler bed as the prior art does, the packed filler bed of this invention is stationary which reduces the torque requirement and the required motor size. The conventional multiple vessels and valves are eliminated using the separated annular fan shape radial flow beds, separated flow distribution segments and rotary device with proper openings. Detailed application of this type includes the use of the device as a dehumidifier, adsorber/regenerator and chemical reactor/regenerator. This will become apparent in the detailed description of the preferred embodiments.

BRIEF DESCRIPTION OF THE DRAWINGS

To simplify the graphs, the numerals without the letter "B" for the elements in each graph represent the parts in the first section and the numerals with letter "B" notation represent the parts in the second section.

DETAILED DESCRIPTION OF THE PREFERRED EMBODIMENTS

Figure 1:
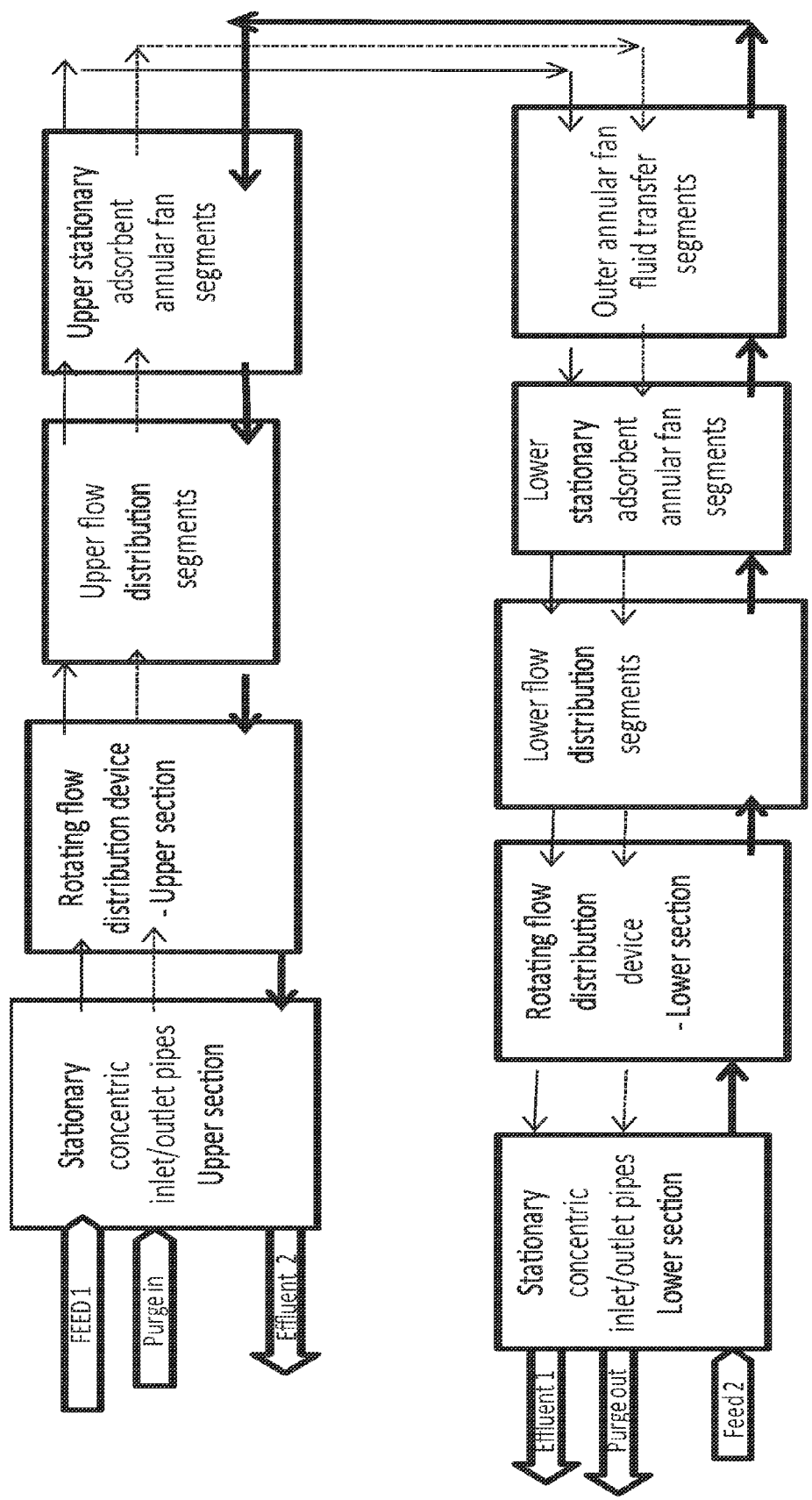
FIG. 1 presents the block flow diagram for a radial flow continuous reaction/regeneration apparatus in the counter current mode.

What is probed into the invention is a radial flow continuous reaction/regeneration apparatus. The application of the invention is not confined to specific details familiar to those who are skilled in the art. On the other hand, the common structures and elements that are known to everyone are not described in detail to avoid unnecessary limits of the invention. Some preferred embodiments of the present invention will be described in greater detail in the following disclosure. However, it should be recognized that the present invention can be practiced in a wide range of other embodiments besides those explicitly described and the scope of the present invention is expressly not limited except as specified in the accompanying claims.

The first embodiment according to this application discloses a radial-flow continuous reaction/regeneration apparatus. This apparatus comprises a minimum of one stationary pipe with a plurality of inlet/outlet channels, a rotary device connected with the stationary pipe(s), a stationary reaction/regeneration box communicates with the rotary device. The mentioned rotary device comprises a plurality of flow distribution channels wherein the mentioned flow distribution channels are individually employed to receive/transfer fluid from/to the inlet/outlet channels of the stationary pipe(s). Furthermore, the flow distribution channels of the rotary device comprise of the rotating flow channels to deliver the flow through sets of face plate openings into the rotating flow distribution box(s).

The stationary reaction/regeneration box of this embodiment comprises a plurality of flow distribution segments, a plurality of annular fan segments, and a plurality of outer annular fan fluid transfer segments. The flow distribution segments communicate with the rotating flow channels of the rotary device through the flow distribution box(s). Each of the flow distribution segments are isolated from each other and divided into a first portion and a second portion below said first portion. Each of the flow distribution channels of the rotary device communicates with the corresponding first portion(s) or second portion(s) and each the portion communicates only to one of the flow distribution channels. The annular fan segments are outside to the flow distribution segments. Each of the annular fan segments are isolated from each other and divided into a first section and a second section below said first section, wherein each segment of the first section communicates with the corresponding first portion and each segment of the second section communicates with the corresponding second portion. The outer annular fan fluid transfer segments are outside to the annular fan segments, wherein each of the outer annular fan fluid transfer segments is isolated from each other. Each annular fan segment of the first section communicates with the corresponding segment of the second section through the corresponding outer annular fluid transfer fan segment.

In one preferred example of the first embodiment, the radial flow continuous reaction/regeneration apparatus further comprises a drive means to drive the rotary device rotating by a preset time schedule. After rotating the rotary device at a set angle, each of the flow distribution channels of the rotary device are orientated to different flow distribution segments of the stationary reaction/regeneration box.

In one preferred example of the first embodiment, the stationary pipe(s) comprise a plurality of concentric inlet/outlet channels.

In another preferred example of the first embodiment, the stationary pipe(s) comprise a plurality of non-concentric inlet/outlet channels. Preferably, after rotating the rotary device in a set angle, the non-concentric inlet/outlet channels are positioned according to the flow distribution channels of the rotary device, so that each of the inlet/outlet channels can communicate with corresponding flow distribution segments in the reaction/regeneration box through flow distribution channel(s) of the rotary device.

In one preferred example of the first embodiment, the mentioned stationary reaction/regeneration box can further comprise a plurality of inner porous elements and a plurality of outer porous elements. Each of the inner porous elements is positioned between the flow distribution segment and the corresponding annular fan segment. Each of the outer porous elements is positioned between the annular fan segment and the corresponding outer annular fan fluid transfer segment. To properly distribute the fluid into the annular fan segment, the opening on the porous elements are preferably evenly distributed angularly that the flow resistances are the same for each reaction/regeneration annular fan segment. The mentioned inner porous elements and the outer porous elements are individually selected from the group of: screen, perforated plate.

Figure 3A:
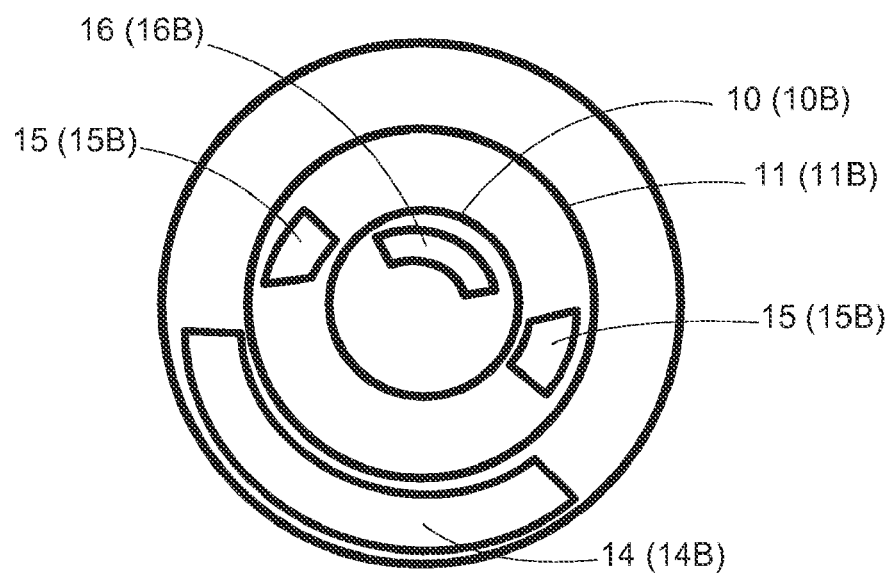
FIG. 3A presents the top view of a rotating face plate with sets of opening.
Figure 3B:
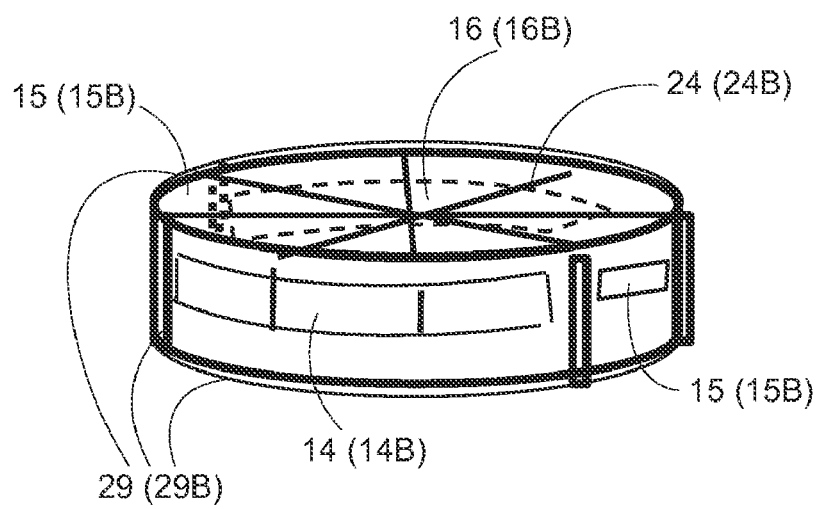
FIG. 3B presents a side view of a flow distribution box of a rotary device.

In one preferred example of the first embodiment, the rotary device passes through the core of the stationary reaction/regeneration box. The rotating flow channels of the rotary device are concentric pipe channels. Sets of opening at the end face plate of the concentric pipe channels as shown in FIG. 3A direct fluids in the rotating flow channels to an angularly equally divided flow distribution box as shown in FIG. 3B. In another preferred example of this embodiment, the rotating flow channels of the rotary device are non concentric flow channels. Preferably, after the rotary device rotates in a set angle, the openings at one end of the non-concentric flow channel are positioned according to the corresponding inlet/outlet channels of the stationary pipe. The face plate openings in FIG. 3A at the other end of the non-concentric flow channels are positioned to direct the flow to the angularly equally divided flow distribution box as shown in FIG. 3B. Each of the inlet/outlet channels communicates with different flow distribution segments of the reaction/regeneration box through the flow distribution channels of the rotary device.

The radial flow reaction/regeneration apparatus according to this application is operated with multiple time steps with feeds and effluents that flow radially into and out of the packed annular fan segments. The annular fan segment is equally divided into angular segments in fan shape by partition plates and the number of time step is typically equal to the number of annular fan segment. By stepwise rotation of the rotary device to distribute the fluids into the flow distribution segments, the feeds and effluents are passed successively into alignment with the annular fan segments. Each annular fan segment goes through different process conditions at each different time step and completes one process cycle with a full 360 degree rotation of the rotary device. One process cycle can include several processing steps such as adsorption/reaction, purge and regeneration in sequence. Different annular fan segments can be at different process conditions at the same time step. As the number of the time step per cycle and the annular fan segments increase for a given cycle time, the process performance approaches that of the continuous process with constant product quality.

In one preferred example of the first embodiment, at least one of the first sections or one of the second sections of the annular fan segments is filled with filler. The mentioned filler is selected from the following: solid particle, structure packing, gel, polymer fiber. According to this embodiment, the filler is selected from absorbent, catalyst, or filter. When the radial-flow continuous reaction/regeneration apparatus is employed as separation device, the mentioned filler is an adsorbent of the type of a solid particle, structure packing, gel, or polymer fiber. When the radial-flow continuous reaction/regeneration apparatus is employed as a chemical reactor, the mentioned filler is a catalyst of the type of a solid particle, structure packing, gel, or polymer fiber. When the radial-flow continuous reaction/regeneration apparatus is employed as filtration equipment, the mentioned filler could also be a filter of the type of a solid particle, structure packing, gel, or polymer fiber.

Figure 2:
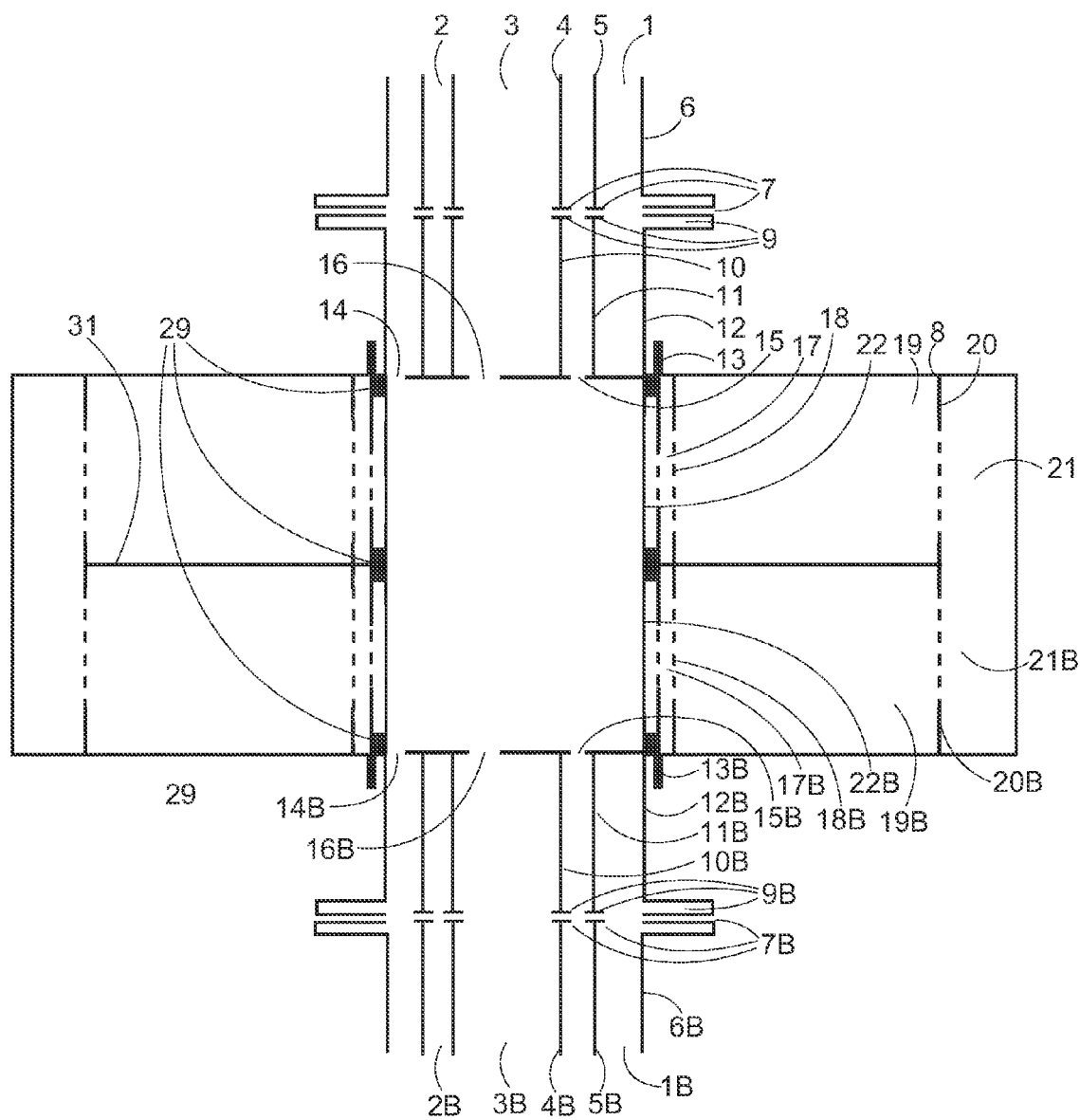
FIG. 2 presents a side view of a radial flow continuous reaction/regeneration apparatus according to the first embodiment of this invention.

FIG. 2 illustrates the side view for a typical arrangement of the mentioned radial-flow continuous reaction/regeneration apparatus of the first embodiment with two stationary pipes with inlet/outlet channels. The first example of the first embodiment is a dehumidifier and with a desiccant as filler in the annular fan segments. The second example of the first embodiment is a Catalytic Reforming reactor/regenerator with a catalyst as filler in the annular fan segments. The numerals 1, 2 and 3 denote the first inlet/outlet channels of the first stationary pipe 6. The fluids are separated by the concentric inner walls 4 and 5. The first stationary pipe 6 is connected to a rotary device. The inner walls 10 and 11 separate the fluids in the rotary device. The first portion (shown as upper portion) rotary device 12 comprises a concentric pipe with rotating flow channels and face plate openings as shown in FIG. 3A, and a flow distribution box as shown in FIG. 3B. The rotating flow channel pipe, face plate with openings and flow distribution box of the upper rotary device 12 are driven by a drive means, not shown in the figures, rotating about the common center of the first stationary pipe 6. The openings for the flow distribution channels 14, 15, 16 at the face plate above the flow distribution box in FIG. 3B communicate with the first stationary pipe 6 to receive the fluid from the first inlet/outlet channels 1 or 2 and 3 via the annular rings formed by the concentric seal rings 7 and 9. The interfaces between seal rings 7 and 9 are polished with flat finish to enable the faces to form a fluid tight seal between fluids in the first inlet/outlet channels 1, 2, 3 and outside environment. The flow distribution box of the upper rotary device 12 is extending into the center hole of the stationary reaction/regeneration box 8 through the seal ring element 13. The tight clearance between the seal ring element 13 and the upper rotary device 12 prevents excessive fluid communication between the outside environment and the stationary reaction/regeneration box 8 internals.

Figure 3C:
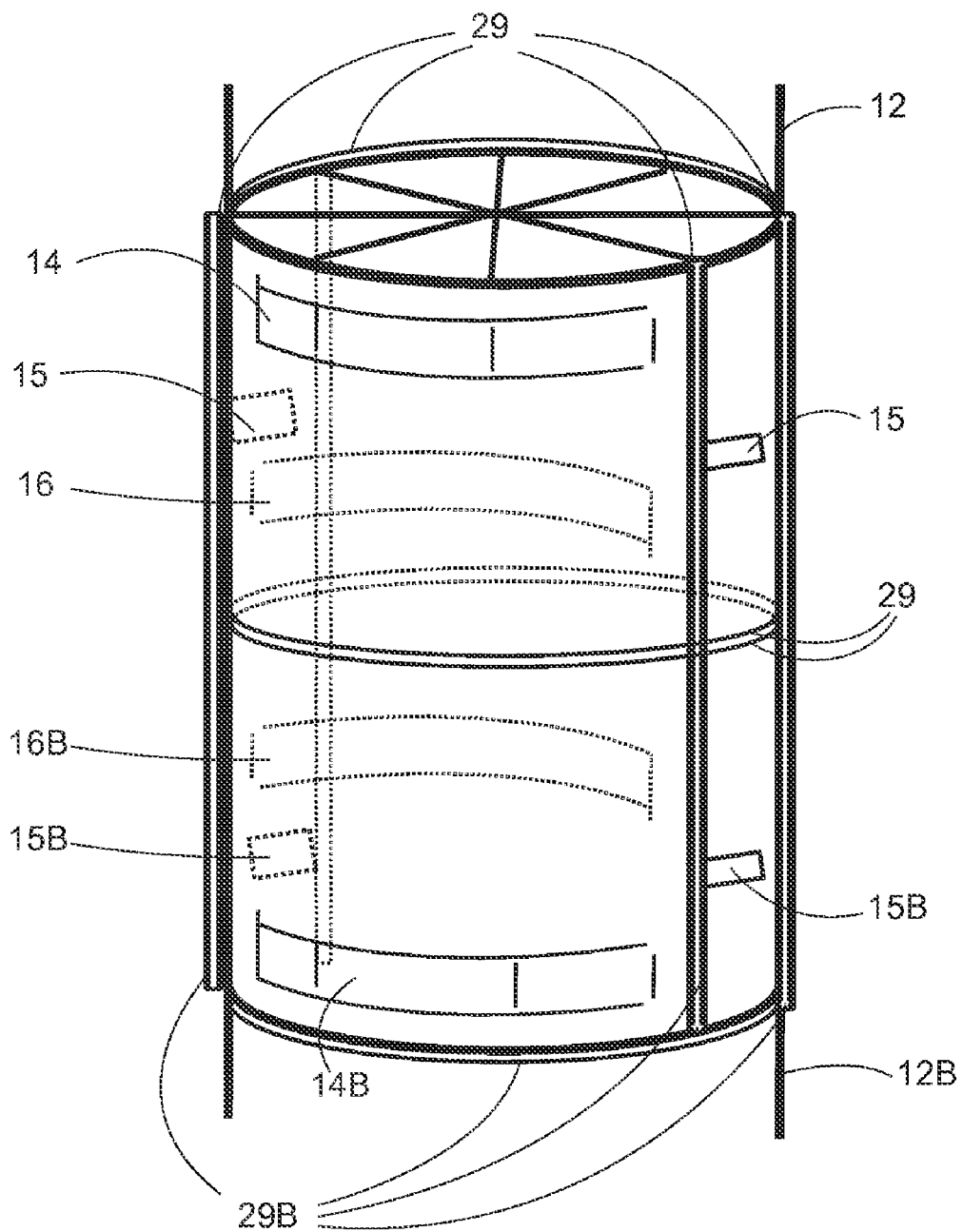
FIG. 3C presents a side view of the combination of two flow distribution boxes (first and second) in a rotary device of FIG. 2.
Figure 4:
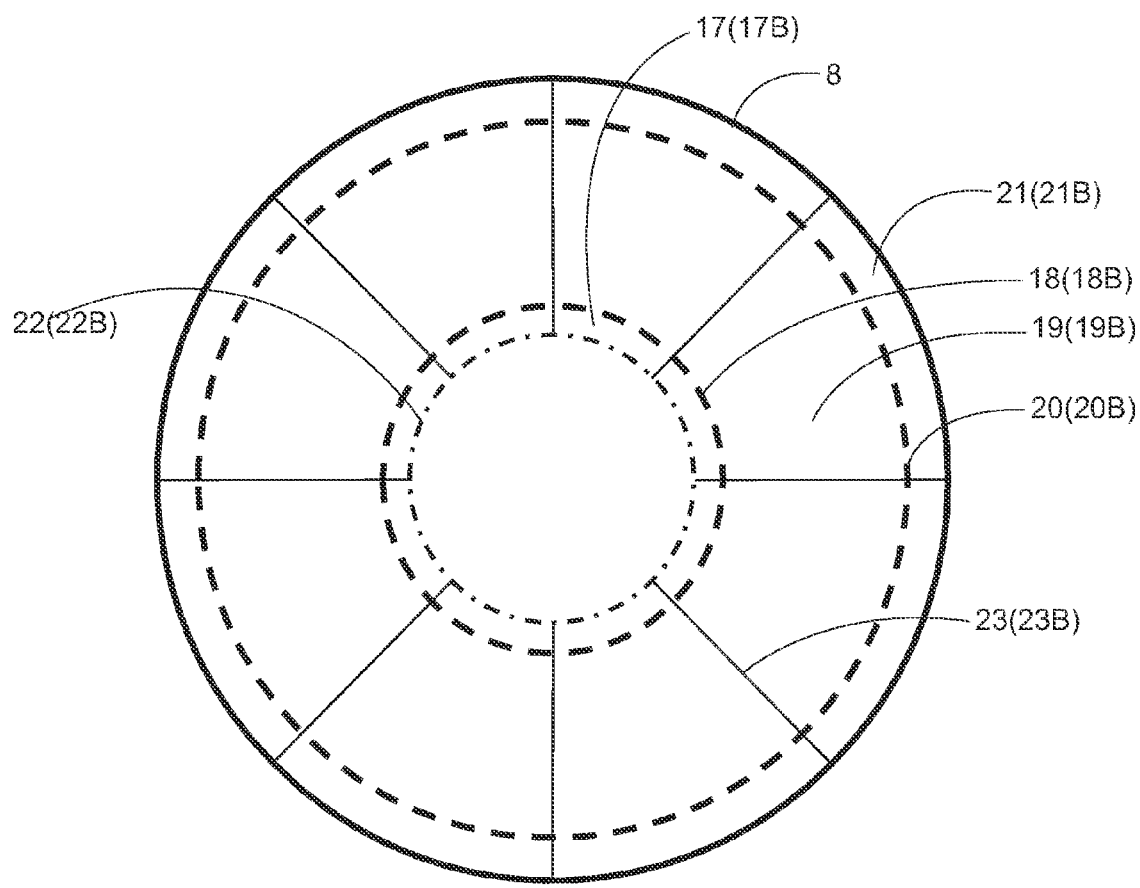
FIG. 4 illustrates the top view of the flow distribution and annular fan and outer annular fan fluid transfer segments of FIG. 2.

FIG. 3A gives the top view of the end face plate openings for the upper rotary device 12. FIG. 3B gives the side view of a flow distribution box for the upper rotary device 12. The flow distribution box is angularly divided into equal compartments by partition plates 24. The solid plates 24 prevent the cross contamination between different fluids. The number of compartments is typically equal to the number of time steps for the process cycle. In this particular illustration, one process cycle is divided into 8 time steps and there are 8 compartments in the flow distribution box. There are three compartments have process feed, three compartments have regeneration fluid and two compartments have purge fluid in it. Instead of dividing the flow distribution box into equal flow distribution compartments, it is also possible to combine the three equal compartments 14 into one and three equal compartments 16 into another single larger compartment alternately. The time steps remains at 8 and is equal to the number of annular fan segments 19 as shown in FIG. 4. The fluid from the first inlet/outlet channel 1 in the outer annular position of the stationary pipe 6 is transferred into the three flow distribution channels 14, the fluid from the first inlet/outlet channel 2 in the middle annular position of the stationary pipe 6 is transferred into the two flow distribution channels 15, and the fluid from the first inlet/outlet channel 3 at the center of the pipe 6 is transferred into the three flow distribution channels 16 in the flow distribution box of the upper rotary device 12 though the respective upper rotating flow channel pipe end face plate opening(s). The peripheral of the flow distribution box of the upper rotary device 12 has openings align with the corresponding stationary flow distribution segments 17 in FIG. 2 and FIG. 4. The clearance between the seal elements 29 (on the flow distribution box of the upper rotary device 12) and inner perforated plate/screen wall 22 are kept at minimum for smooth rotation and minimum cross leakages. Four straight and two circular sealing elements 29 in FIG. 3B prevents cross leakages between fluids in the upper rotary device. FIG. 3C gives a side view of the rotary device with two flow distribution boxes as mirror images to each other.

FIG. 4 gives the top view of the flow distribution segments, the reaction/regeneration annular fan segments and the outer annular fan fluid transfer segments. Concentric perforated plates or screens are used to separate the reaction/regeneration annular fan segments, from the inner flow distribution and outer annular fan fluid transfer segments. The inner flow distribution, outer fluid transfer and reaction/regeneration annular fan segments are angularly divided equally into 8 annular fan sections by partition plates 23. Each segment in the reaction/regeneration annular fan segments is loaded with filler, and the filler is confined by the screens 18, 20 and partition plates 23. For the example 1 of this embodiment, the mentioned filler is a desiccant such as silica gel. For the example 2 of this embodiment, the filler is a catalytic reforming catalyst. The flow distribution segments 17 are segmented and bounded by the partition plate 23 and inner (22) and intermediate (18) perforated plate/screen. The outer annular fan fluid transfer segments 21 are segmented and bounded by the partition plate 23, inner wall of the stationary reaction/regeneration box 8 and outer (20) perforated plate/screen. The numbers of the flow distribution segments and the outer annular fan fluid transfer segments are the same as the number of reaction/regeneration annular fan segments. The inner plate/screen 22, as shown in FIG. 2 and FIG. 4, has openings to the flow distribution segments 17 which align with the openings of the flow distribution channels 14, 15 and 16, as shown in FIG. 2 and FIG. 3B, on the circumference of the flow distribution box. As the openings of the flow distribution channels 14, 15, 16 on the upper rotary device, as shown in FIGS. 3A and 3B, rotates stepwise through 360 degree during a process cycle, the respective opening(s) on plate 22 communicates the flow distribution channels 14, 15 and 16 with the stationary flow distribution segments 17 respectively. The inlet/outlet channel 1 communicates with the 3 reaction/regeneration annular fan segments through flow distribution channel 14 and respective flow distribution segments 17, the inlet/outlet channel 2 communicates with the 2 reaction/regeneration annular fan segments through flow distribution channel 15 and flow distribution segments 17, and the inlet/outlet channel 3 communicates with the 3 reaction/regeneration annular fan segments through flow distribution channel 16 and flow distribution segments 17 simultaneously at a given time step. Each annular fan segment is in contact with the fluid in the inlet/outlet channel 1 for ⅜ of the cycle, in contact with the fluid in the inlet/outlet channel 2 for ⅛ of the cycle, in contact with the fluid in the inlet/outlet channel 3 for ⅜ of the cycle and then in contact with the fluid in the inlet/outlet channel 2 again for ⅛ of the cycle as the process steps through the cycle sequentially.

The first two examples illustrated that more than a process fluid and a regeneration fluid can be distributed to different segments of the apparatus at the same time. This is different from the rotary flow distributor disclosed by U.S. Pat. No. 5,779,771. A third purge fluid introduced in the example 1 and 2 in addition to the feed and regeneration fluids improves the separation performance when this invention is used as a separation device and improves the process performance and safety when this invention is used as a chemical reactor.

A portable dehumidifier is the third example of the first embodiment with a single stationary pipe. With the desiccant in the annular fan segments, the reaction/regeneration box turns into a dehumidification/regeneration box. There are only one inlet and one outlet channels in the single stationary pipe for this device when the dew point requirement for the product air is not severe. In comparison to the example 1, only upper rotary device with one flow distribution box is used. In order to condense the water, the second section of the annual fan segments has condensing coils instead of desiccant in it. There is at least one drain positioned at the lower point(s) of the stationary dehumidification/regeneration box nearby the condensing coils. In another preferred example of this embodiment, the radial-flow continuous dehumidification/regeneration apparatus can further comprise an air inlet positioned at one side of the stationary dehumidification/regeneration box near the center of condensing coil segments where the effluents from the condensing coils meet and redistribute, wherein the mentioned side is typically opposite to the stationary pipe.

Figure 5:
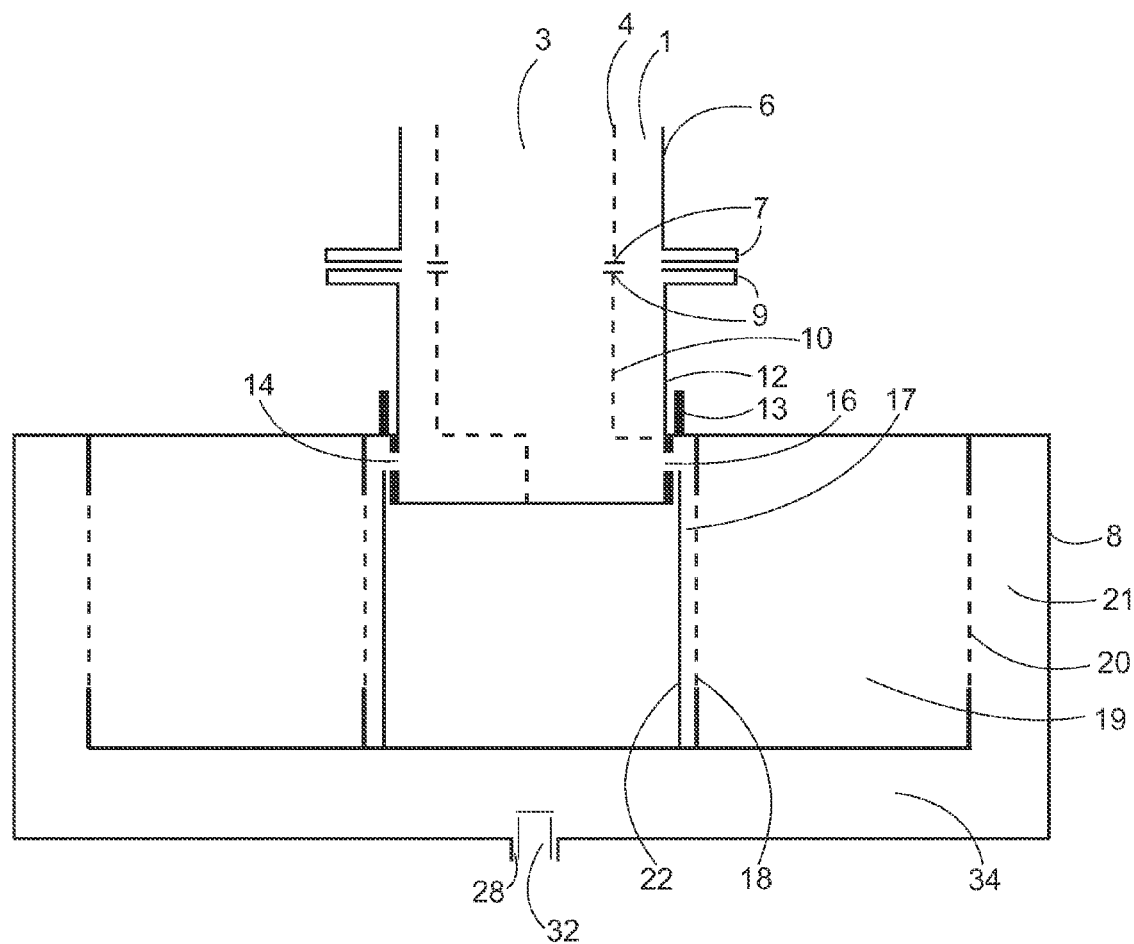
FIG. 5 presents a side view of a radial flow continuous reaction/regeneration apparatus employed as a portable air dehumidifier.
Figure 6A:
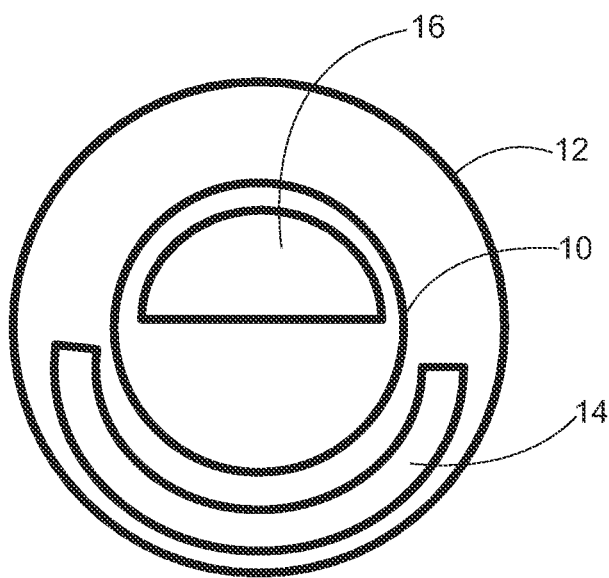
FIG. 6A illustrates the top view of a face plate with openings between the end of the rotational concentric pipe and the flow distribution box of the rotary device of the radial flow continuous dehumidification/regeneration apparatus of FIG. 5.

FIG. 5 gives a side view of this portable air dehumidifier. The hot regeneration air enters the inlet channel 3 of the stationary concentric pipe 6 and passes the seal plates 7, 9 and the center channel of the rotary device 12 before reaching the face plate opening of the hot air flow distribution channel 16 as illustrated in FIG. 6A. The hot air flows through the opening on the end face plate in FIG. 6A and enters the hot air flow distribution channel 16 in the flow distribution box as shown in FIG. 6B.

Figure 6B:
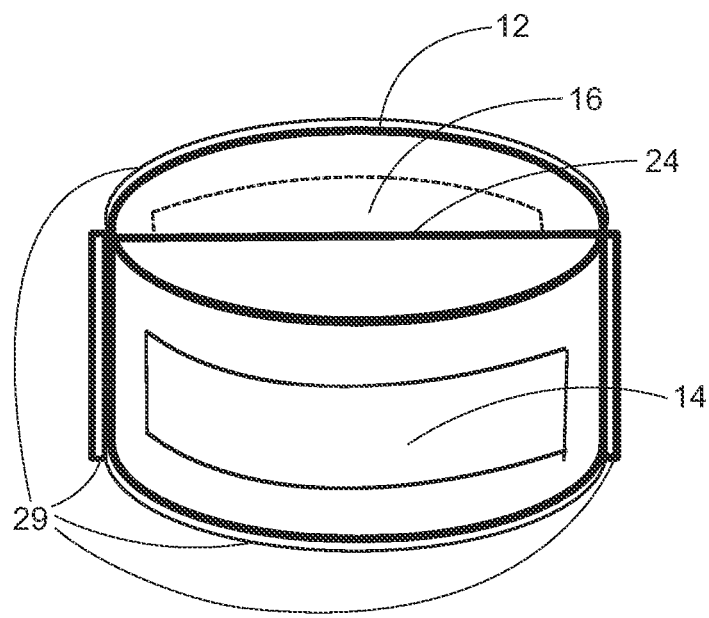
FIG. 6B illustrates a side view of the flow distribution box of the rotary device in the radial flow continuous dehumidification/regeneration apparatus of FIG. 5.

The flow distribution box of the rotary device in FIG. 6B is divided into two compartments by the partitioning plate 24. Half of the flow distribution box is part of the regenerative air flow distribution channel and communicates with the center flow distribution channel in the rotary device 12 through the half circle face plate opening of the flow distribution channel 16. As illustrated in FIG. 4, the hot air is distributed into the 4 stationary regeneration flow distribution segments 17 by aligning the peripheral opening of the flow distribution channel 16 of the rotary device 12 with the side openings on plate 22. The clearances between seal elements 29 on the rotary device 12 in FIG. 6B and the plate 22 in FIG. 5 are kept at minimum to avoid excessive cross leakage between the flow distribution channels 14 and 16 and still be able to rotate the flow distribution box freely.

Figure 7A:
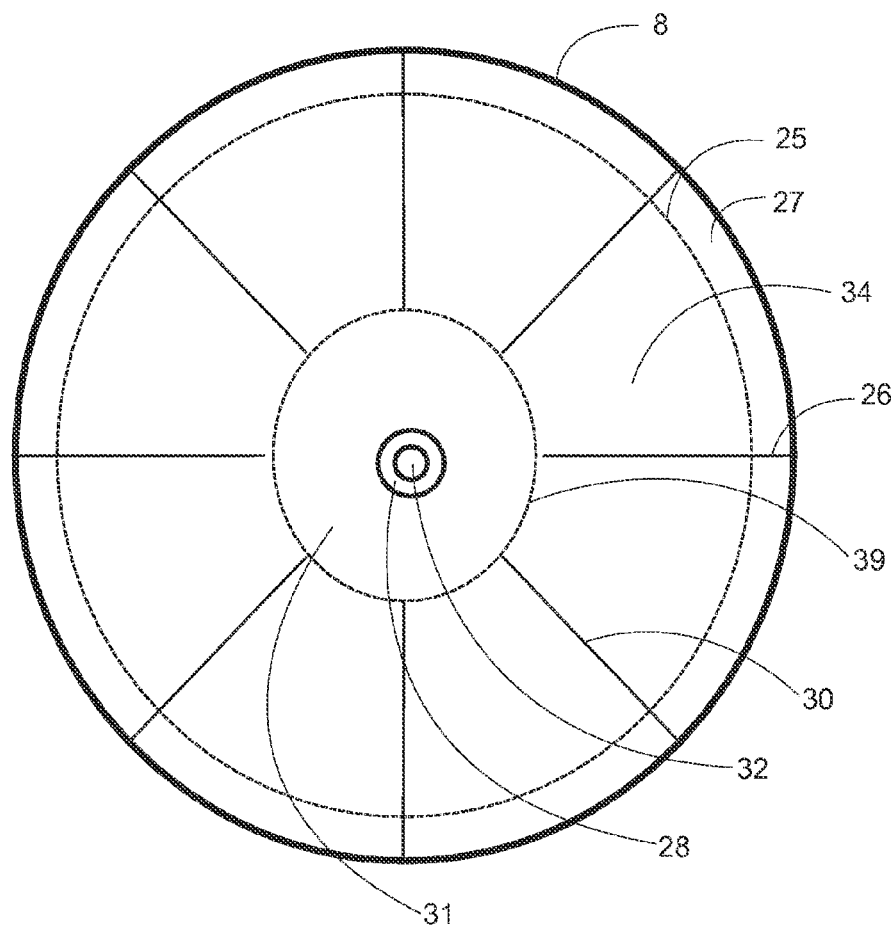
FIG. 7A illustrates the top view of the bottom condenser section of the radial flow continuous dehumidification/regeneration apparatus of FIG. 5.
Figure 7B:
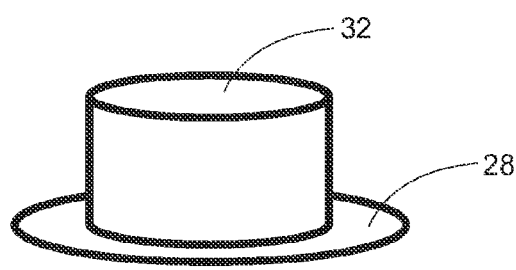
FIG. 7B illustrates a side view of the moist process air inlet riser for the radial flow continuous dehumidification/regeneration apparatus of FIG. 5.

The rotary device 12 rotates 45 degrees each step for the 8 segment design and is in an aligned position such that the openings of the flow distribution channels 14 and 16 are not communicate with the same stationary inner flow distribution segment 17 any time except for a very short duration during the fast rotation of rotary device. The hot regeneration air passes the corresponding opening(s) on the inner plate 22 as shown in FIG. 4 and FIG. 5, the intermediate plate/screen 18 and enters the spent desiccant bed in the annular fan segment 19. The desiccant material is, for example, silica gels, activated alumina, molecular sieves or any other materials capable of adsorbing $H_2O$ at the low temperature and desorbing $H_2O$ vapor at the high temperature. The spent adsorbent is the desiccant loaded with $H_2O$ at a temperature lower than the regeneration air. The spent desiccant is heated up and regenerated by the hot regeneration air. The desorbed $H_2O$ and the hot regeneration air leave the four desiccant annular fan segments 19, pass outer perforated plate/screen 20 and enter the four outer annular fan fluid transfer segments 21. The partitioning plates 23 shown in the FIG. 4 are extended into the bottom section of the dehumidification/regeneration box 8 and are shown as partition plate 30 and 26 in FIG. 7A. The top view of the bottom section of the dehumidification/regeneration box 8 is given in FIG. 7A. The lower outer annular fan fluid transfer segments 27 are the extension of the upper outer annular fan fluid transfer segments. These outer annular fan segments have the low flow resistance to distribute the fluid into the annular fan shape condenser segments 34 where the hot regeneration air is cooled and water is condensed. The condenser is divided into 8 annular fan shape segments by the partition plate 30. The annular fan shape condenser segments are confined by the concentric dotted circle lines 25 and 39. Inside the dotted circle line 39 is a flow redistribution chamber 31 where the partially cooled regeneration air from the four annular fan shape condenser segments 34 are combined and redistributed into the other 4 annular fan shape condenser segments 34 at the opposite side. The partially cooled regeneration air from the flow redistribution chamber 31 is further cooled by the condensing coils and more $H_2O$ is removed. The regeneration air with saturated water exiting from the condensing coils is passed into the 4 outer annular fan fluid transfer segments 27. The water condensed by the condensing coils is removed by a drain 28 shown in FIGS. 5, 7A and 7B at the center of the flow redistribution chamber 31. The water saturated air from the four outer annular fan fluid transfer segments 27 flows into the four upper outer annular fan fluid transfer segments 21 as shown in FIG. 4 and then goes into the four annular fan segments 19 through the perforated plate/screen 20. The 4 adsorption annular fan segments 19 are opposite to the four regeneration annular fan segments. $H_2O$ in the cooled saturated air is adsorbed and removed by the cool adsorbent. The dried air effluent flows through perforated plate/screen 18, stationary flow distribution segments 17, opening(s) on plate 22 as shown in FIG. 4 and FIG. 5, the corresponding flow distribution channel in the flow distribution box and plate opening 14 of the rotating flow channel in FIG. 5, FIG. 6A and FIG. 6B, the outer annular of the rotating flow channel of the rotary device 12, sealing plate 9 and 7 and then exit the inlet/outlet channel 1 as shown in FIG. 5. The internal walls of stationary pipe and rotary device denoted as 4 and 10 separate the fluids in inlet/outlet channel 1 and 3 are shown in FIGS. 5 and 6A. The seal 13 prevents the leaks of process air to the ambient air. When the amount of the hot regeneration air requirement is less than the cool process air to be dehumidified, a riser 32 shown in FIG. 5, FIG. 7A and FIG. 7B introduces more cool moist air into the redistribution chamber 31. The condensed water is drained through the drain 28 around the riser 32. Drain 28 of FIG. 5, FIG. 7A, and FIG. 7B can be either annular opening or multiple small drain holes around 32.

Instead of withdrawing the dry effluent from the first section of the flow distribution segments as the portable dehumidifier as discussed before, a variation of the flow distribution box of the rotary device with the angularly divided compartment and the single stationary pipe to withdraw the effluent from the second section of the flow distribution segment wherein the feed is fed into the first section is possible.

It is achieved by using the partition plates to angularly divide the flow distribution box into flow distribution compartments corresponding to the flow distribution segments of the stationary reaction/regeneration box and divide the each flow distribution compartment further into inner compartments and outer compartments. Each of the outer compartments is divided into a first outer portion and a second outer portion below the first outer portion. Each of the first outer portions or each of the inner compartments communicates to no more than one rotating flow channel. Each of the rotating flow channels communicates to either outer or inner flow distribution compartment but not both. The first outer portions are separated from the inner compartment by partition plate and each of the second outer portions is communicating with the corresponding inner compartment, wherein the first outer portion is communicating to the corresponding first portion of the stationary flow distribution segment and the second outer portion is communicating with the second portion of the stationary flow distribution segment. The process flow path for the annular fan segments are parallel as examples 1, 2 and 3 if the partition plates has no opening on it. With openings on the partition plates that separate the second outer portion compartments from each other, the flow path for the annular fan segments can turn into the series flow similar to example 4.

Example 4 of the first embodiment illustrates an alternate process flow path inside the reaction/regeneration box using a single stationary inlet/outlet pipe. FIGS. 10A through 10D illustrate the changing of the flow distribution box reroutes the fluid flow path inside the reaction/regeneration box. The moist air from the stationary inlet/outlet pipe and rotating flow channel, goes through the face plate opening 1F (FIG. 10A) positioned at the one end of the rotating flow channels, before getting into the compartment A of the flow distribution box in FIG. 10B. The flow distribution box is angularly divided into 8 equal flow distribution compartments corresponding to the annular fan segments in FIG. 4. Each of the flow distribution compartments is isolated from each other and divided into a first portion and a second portion below first portion by plate 40 as shown in FIG. 10D. Each flow distribution compartment of the flow distribution box communicates through an opening (openings) on plate 22 of FIG. 4 to the corresponding flow distribution segment of the stationary reaction/regeneration box. The moist air from the opening 1F flows through the first portion of the flow distribution compartment A, the corresponding first portion of the flow distribution segment in FIG. 4, the first section of the annular fan segment with desiccant, the first section of the outer annular fan fluid transfer segment and the second section outer annular fan fluid transfer segment. $H_2O$ in the moist air is further removed by the desiccant in the second section of the annular fan segment and exits the stationary reaction/regeneration box through the second portion of the flow distribution segment. The effluent is sent to the corresponding second portion of the flow distribution compartment A of the flow distribution box of the rotary device as show in FIG. 10C. As shown in FIG. 10C, every other partition plate in the second portion of the flow distribution compartments has an opening(s) denoted as 41 so that fluids can flow between the two adjacent flow distribution compartments as required. The moist air flows from the flow distribution compartment A to the second portion of the flow distribution compartment B, and then flows into the corresponding second section annular fan segment through the corresponding second portion flow distribution segment in the stationary reaction/regeneration box. The outer annular fan fluid transfer segment transfers the fluid from the second section of the outer annular fan fluid transfer segment to the first section of the outer annular fan fluid transfer segment, and to the corresponding first portion of the flow distribution compartment B of the rotating flow distribution box in FIG. 10B through the first section annular fan and first portion flow distribution segment. As shown in FIG. 10B, the partition plates between compartments B, C and compartments F, G have openings denoted as 41, so that the mentioned adjacent compartments for those sets can cross communicate with each other. The fluid from the first portion of the compartment B flows into the compartment C in FIG. 10B. It follows the flow path through the corresponding first portion flow distribution segments, first section annular fan segments, and the first section outer annular fan fluid transfer segments and then the second section outer annular fan fluid transfer segments, the second section annular fan segments and the second portion flow distribution segments before reaching the second portion flow distribution compartment C of FIG. 10C. The fluid from the second portion flow distribution compartment C goes through the opening 41 and exits the flow distribution compartment D before goes through the corresponding second portion flow distribution segments, second section annular fan segments and outer annular fan fluid transfer segments. The effluent from the outer annular fan fluid transfer segment in the second section flows through the first section outer annular fan fluid transfer segment, first section annular fan segment and first portion flow distribution segments before the dried air product exits the corresponding first portion compartment D of the flow distribution box in FIG. 10B. The dried air effluent continuously flows to the rotating flow channel and stationary outlet pipe through the corresponding opening 1FO on the end face plate opening of FIG. 10A to exit the apparatus.

Figure 10A:
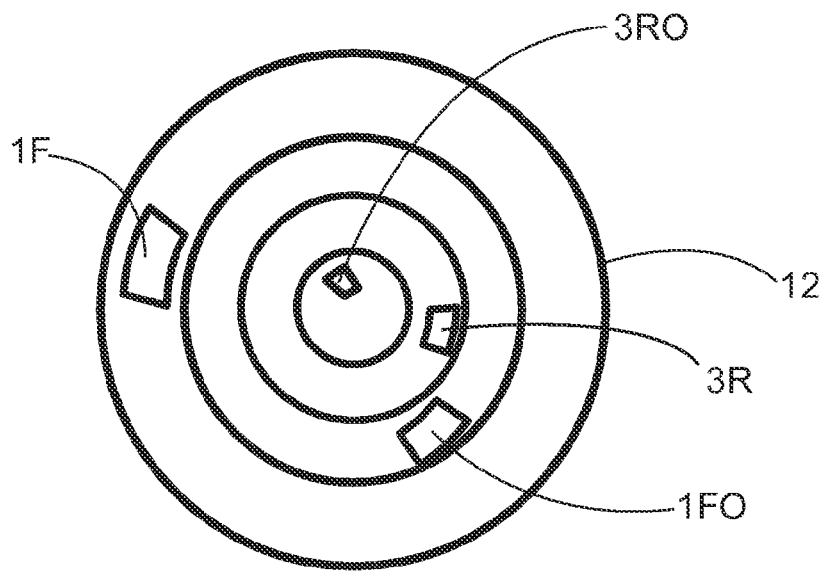
FIG. 10A presents the top view of a face plate with openings between one end of the rotational concentric pipe and the flow distribution box of a rotary device.
Figure 10B:
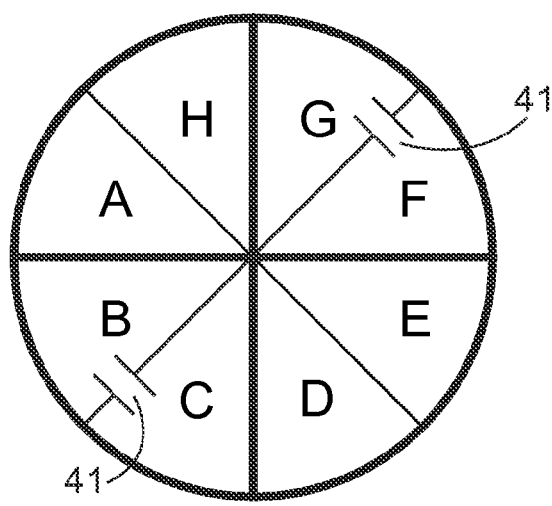
FIG. 10B presents the top view of a compartmented first flow distribution box of a rotary device with two first partition plates with openings corresponding to the example of FIG. 10A.
Figure 10C:
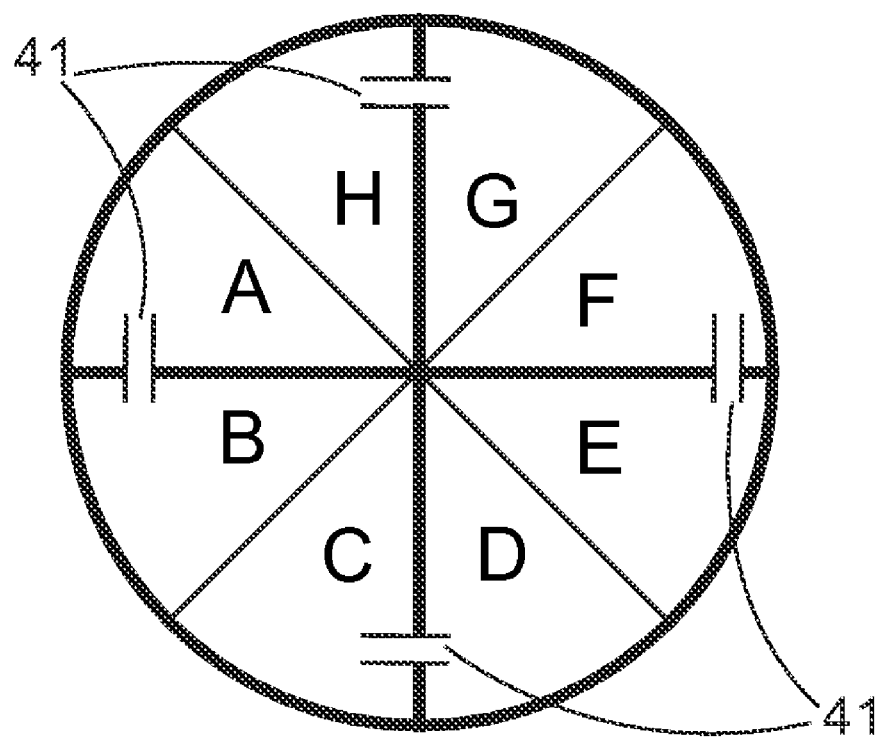
FIG. 10C presents the top view of a compartmented second flow distribution box of a rotary device with four partition plates with openings corresponding to the example of FIG. 10A.
Figure 10D:
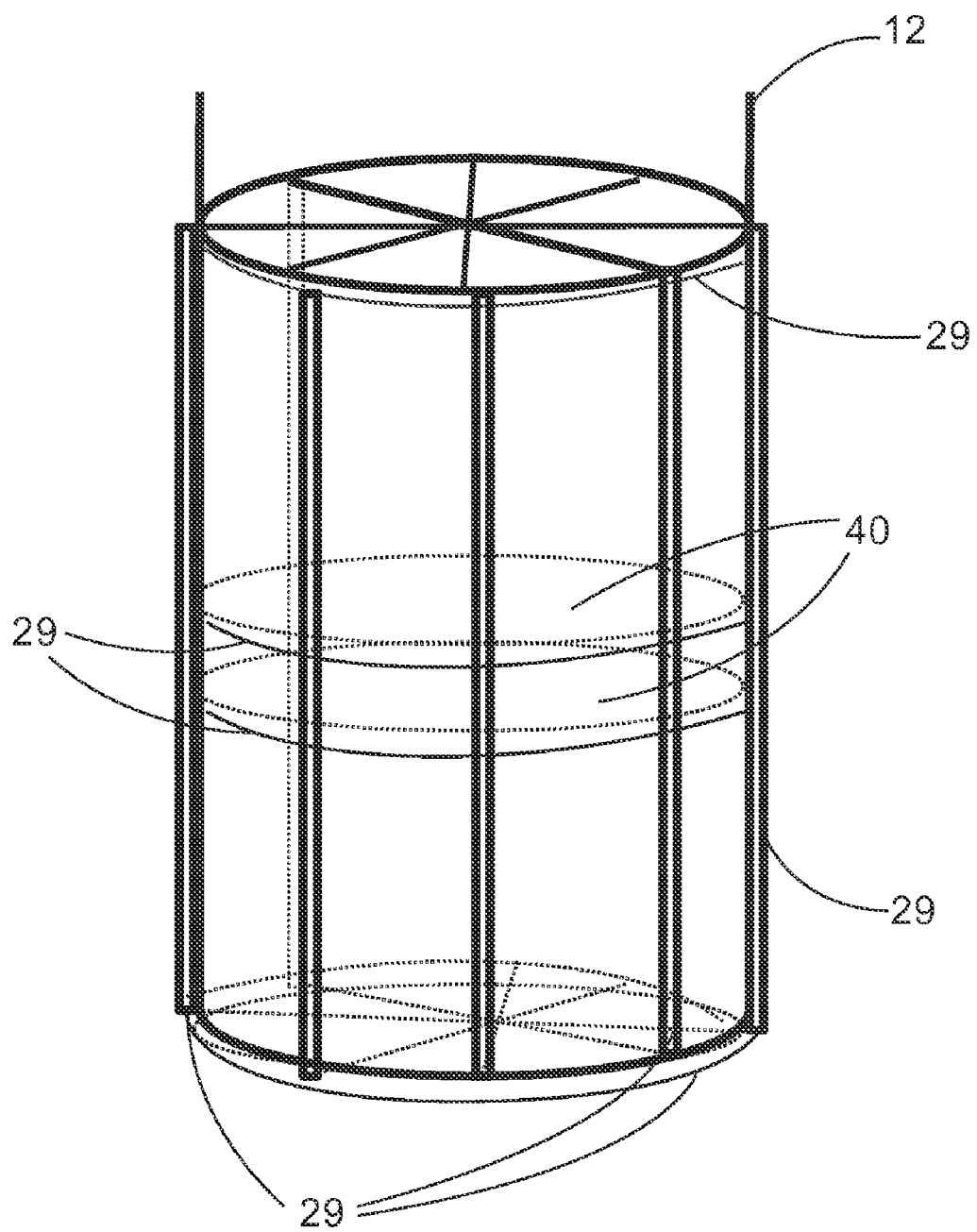
FIG. 10D presents a side view of the combination of first and second flow distribution boxes of a rotary device corresponding to the example of FIG. 10A.

The hot regeneration fluid from the stationary inlet pipe and rotating flow channel enters the flow distribution box through the face plate opening 3R of FIG. 10A. The regeneration fluid goes through the first portion of flow distribution compartment E of FIG. 10B, corresponding segments in the stationary reaction/regeneration box, the second portion of flow distribution compartment E of FIG. 10C to the second portion of flow distribution compartment F through the opening 41 between flow distribution compartment E and F of FIG. 10C, and then flows to the corresponding first portion of flow distribution compartment F of FIG. 10B through the stationary reaction/regeneration box. The regeneration fluid further flows to the first portion flow distribution compartment G through the opening 41 between flow distribution compartment F and G of FIG. 10B. The effluent from the first portion flow distribution compartment G continue flows to the second portion flow distribution compartment G through the corresponding segments of the stationary reaction/regeneration box. The effluent from the second portion flow distribution compartment G flows through the opening 41 between the flow distribution compartment G and H of FIG. 10C, passes the second portion flow distribution compartment H and corresponding segments of the stationary reaction/regeneration box before the regeneration fluid exits through the first portion flow distribution compartment H of the flow distribution box of FIG. 10B, rotating flow channel face plate opening 3RO of FIG. 10A, rotating flow channel and stationary pipe outlet.

FIG. 10D illustrates the separation of the first and second sections of the flow distribution box by the middle plates 40. The sealing elements 29 of FIG. 10D minimize the cross leakages through the gap between the rotary device and stationary reaction/regeneration box. The rotary device 12 rotates and steps through 45 degree each time in counter clockwise direction. The last dehumidification annular fan bed segment before the dry air exits is the first annular fan segment of the regeneration gas flow path in the prior rotational step and the desiccant in the segment is always freshly regenerated.

The above-mentioned Example 4 of the first embodiment illustrates that by changing of the openings on the partition plates inside the flow distribution box, it is possible to change the flow path. The first partition plates are employed angularly to separate the first portions of the flow channel compartments from each other. The second partition plates are employed angularly to separate the second portions of the flow channel compartments from each other. The first and second partition plates are classified into A and B groups. The A group partition plates does not have any opening thereon. Each of the B group partition plates has at least one opening and is positioned between the partition plates of the A group. The partition plates of the first partition plates and the second partition plates employed for the portion of the flow channel compartments that communicate with the rotating flow channel belong to the A group. Each every other partition plate employed for the first portion and the second portion of the flow channel compartments not communicates with the rotating flow channel belong to the B group. To avoid the process fluids from different rotating flow channels mixing in the adjacent compartments of the flow distribution box, the A group partition plate is used for the partition plate either below or above the partition plate separating the two adjacent portions of flow channel compartments communicating to two rotating flow channels. For example, in the case where feed enters into the first portion of compartment A and exits the first portion of compartment D and the hot regeneration fluid enters the first portion of compartment E and exits the first portion of compartment H in FIG. 10B. The second portion compartments A and D in FIG. 10C must have feed in it because each of the two second portions either receives the feed from the first portion or sends the feed to the first portion before it exits. The second portion compartment E and H must have hot regeneration fluid in it because each of the two second portions either receives the hot regeneration fluid from the first portion or sends the hot regeneration fluid to the first portion before it exits. The two second partition plates which separate the two sets of adjacent second portion compartments A and H or D and E in FIG. 10C have to be partition plates of A group to avoid the mixing of the feed and hot regeneration fluid. An alternate design is possible by having the feed and hot regeneration fluid enter the second portions instead of the first portions of compartments A and E, and exit at the second portions of compartments D and H instead of the first portions respectively. The design of partition plates in FIG. 10B becomes the second partition plates design instead of the first partition plate design. The design of partition plate in FIG. 10C becomes the first partition plate design instead of the second partition plate design.

More operation details of example 1, 2, 3 and 4 of the first embodiment are discussed later.

Figure 8:
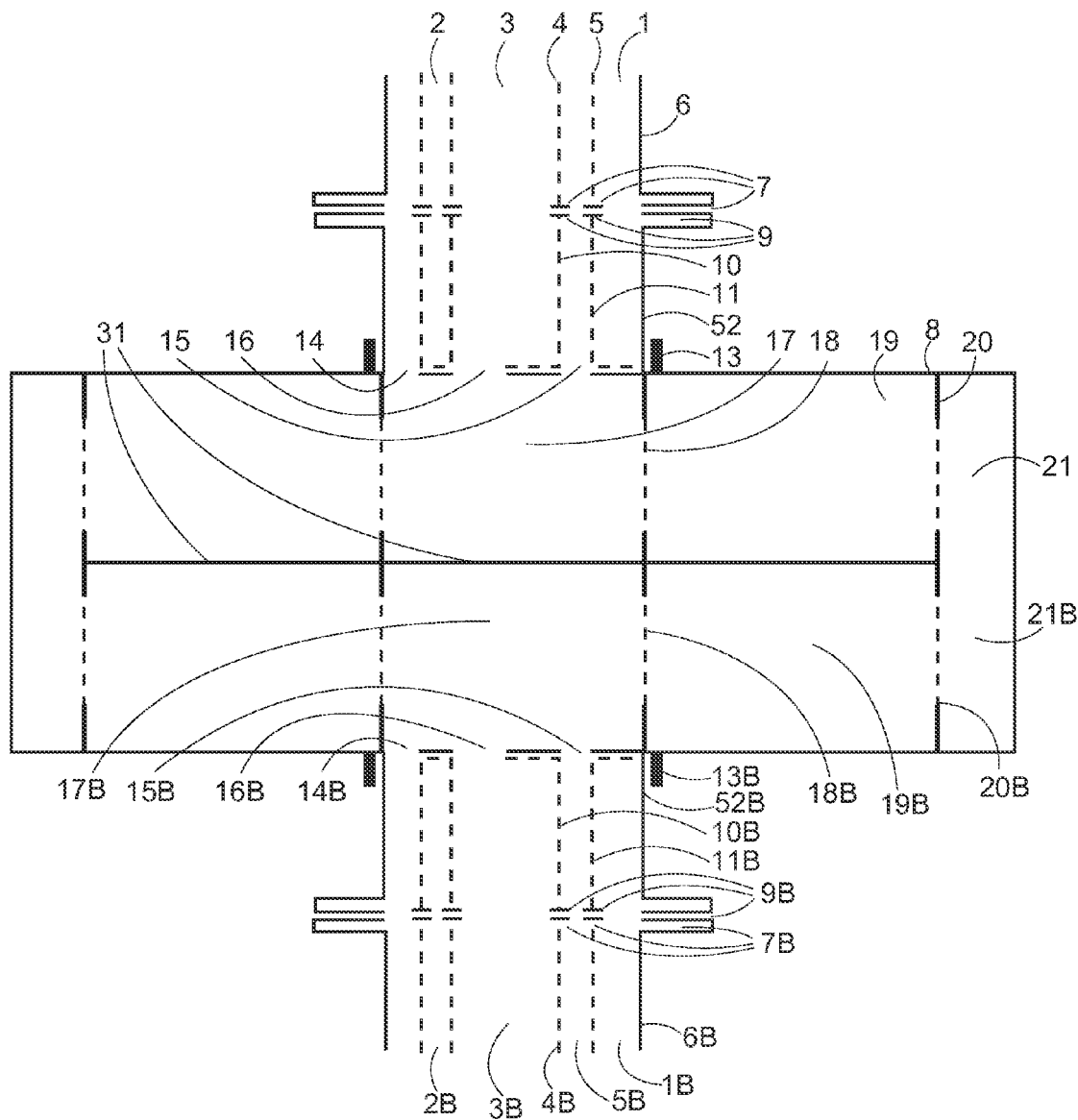
FIG. 8 presents a side view of a design of the radial flow continuous reaction/regeneration apparatus according to the second embodiment of this invention.
Figure 9:
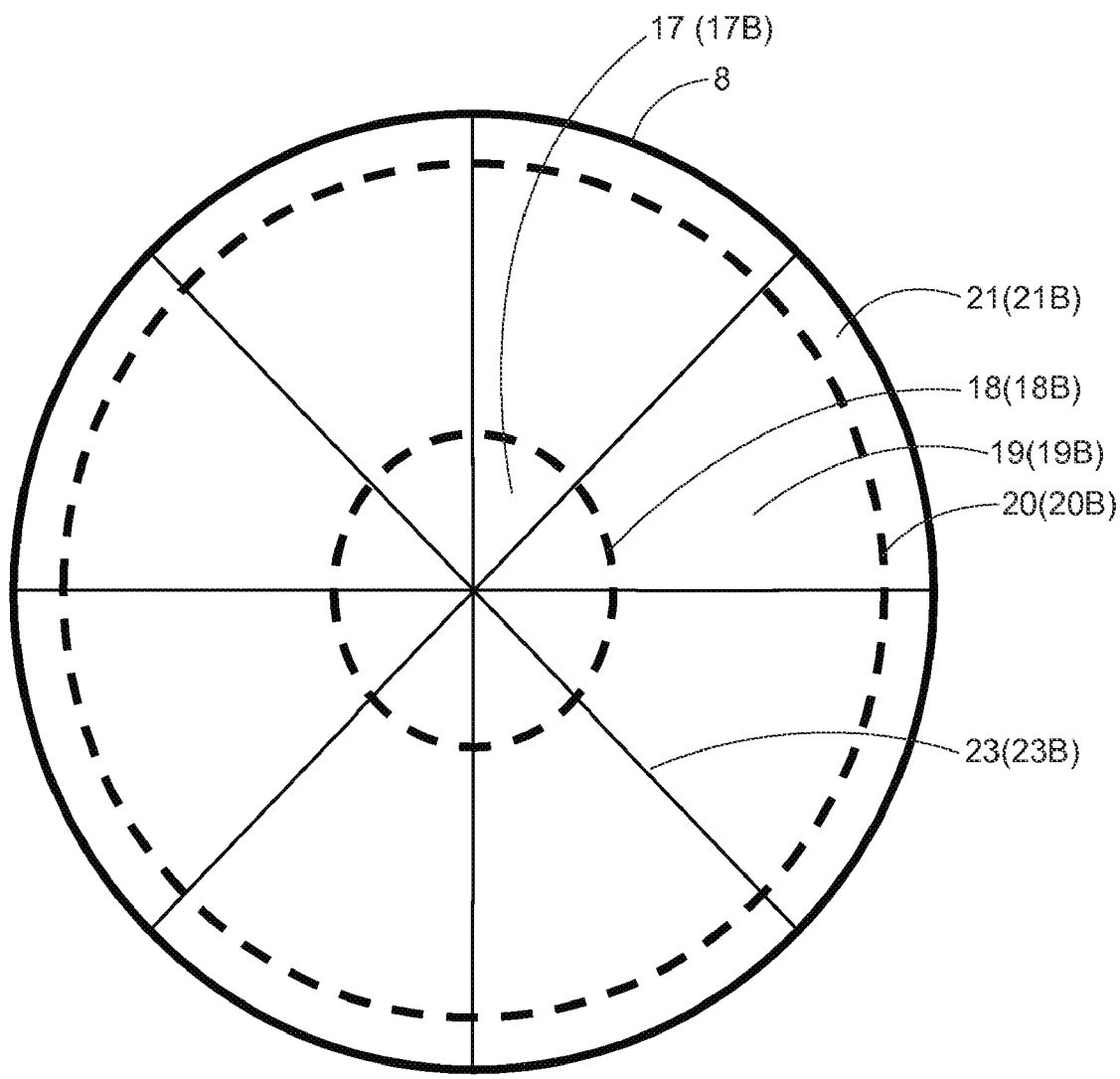
FIG. 9 illustrates the top view of the flow distribution, annular fan and outer annular fan fluid transfer segments of FIG. 8.

FIGS. 8 and 9 illustrate an example for the second embodiment with two inlet/outlet stationary pipes and 8 equal segments in the first (upper) or second (lower) section. It is equivalent to the conventional system with 8 reaction/adsorption vessels with multiple valves which open and close by logic control system to control flows between vessel inlets and outlets and to the feed supplies and effluent destinations.

The second embodiment is different from the first embodiment that the rotary device comprises a first rotary part and a second rotary part, wherein the first rotary part is between the first stationary pipe and the stationary reaction/regeneration box, and the second rotary part is between the stationary reaction/regeneration box and the second stationary pipe. The rotary device 12 and 12B of the FIG. 2 are replaced by the rotary device 52 (52B) as shown in FIG. 8. The top view of the rotating flow channel end face plate openings is given in FIG. 3A. FIG. 4 is replaced by FIG. 9. The flow distribution box of the rotary device in the first embodiment is eliminated and the stationary flow distribution segment positions are changed. The first rotary part and the second rotary part are driven by the same driving means or two synchronized driving means rotate with a preset time schedule. The rotary device rotates one angular segment for each time step. By stepwise rotation of the rotary device, the process steps through each bed segment and complete a whole process cycle with a full 360 degree rotation.

In one preferred example of the second embodiment, either the first section or the second section of each of the annular fan segments is filled with filler. The mentioned filler is selected from the following: solid particle, structure packing, gel, polymer fiber. According to this embodiment, the filler is selected from absorbent, catalyst, or filter. When the radial-flow continuous reaction/regeneration apparatus is employed as separation device, the mentioned filler is an absorbent of the type of a solid particle, structure packing, gel, or polymer fiber. When the radial-flow continuous reaction/regeneration apparatus is employed as a chemical reactor, the mentioned filler is a catalyst of the type of a solid particle, structure packing, gel, or polymer fiber. When the radial-flow continuous reaction/regeneration apparatus is employed as filtration equipment, the mentioned filler could be a filter of the type of a solid particle, structure packing, gel, or polymer fiber.

In the second embodiment, the first (top) and second (bottom) end face plate of the rotating flow channels in FIG. 8 and FIG. 3A have polished flat surfaces with proper openings such as 14, 15 and 16 in the example. The stationary concentric seal rings 7 of FIG. 8 form seals with the flat polished surface seal 9 to separate the fluids in the inlet/outlet channels 1, 2 and 3. The inlet/outlet channel 1 communicates with the openings of the flow distribution channel 14 of the rotary device. The inlet/outlet channel 2 communicates with the openings of the rotary device flow distribution channel 15. The inlet/outlet channel 3 communicates with the openings of the rotary device flow distribution channel 16 continuously as the rotary device 52 rotates 360 degrees step by step though each time step. The fluids flow into one end of the rotary device flow distribution channel openings and exit at the corresponding openings at the other end of the rotary device flow distribution channels. The face plate at the end of the first rotating flow channels has the flat polished surface and forms seals with the top center section of the partition plate 23 of FIG. 9. The fluids in the rotating flow channels of the rotary device communicate with the stationary flow distribution segments 17 of FIGS. 8 and 9 through the plate openings channels 14, 15 and 16. Each of the flow distribution segments 17 is isolated from each other and divided into a first portion and a second portion below said first portion. The flow distribution segments 17 communicate with the annular fan segments 19 through perforated plate/screen 18. The annular fan segments are outside to the flow distribution segments. Each of the annular fan segments are isolated from each other and divided into a first section and a second section below said first section, wherein each segment of the first section communicates with the corresponding first portion and each segment of the second section communicates with the corresponding second portion. The outer annular fan fluid transfer segments 20 are outside to the annular fan segments 19. Each of the outer annular fan fluid transfer segments is isolated from each other and divided into a first and a second section below said first section. Each first section of the segment communicates with the corresponding second section of the annular fan segment through the corresponding outer annular fluid transfer fan segment.

To properly distribute the fluids into the annular fan segment, the openings on the segmented plates/screen 18 and 20 in FIGS. 8, 9 are preferably evenly distributed angularly that the flow resistance of the opening are the same.

The second (lower) portion of the flow distribution segments, the second (lower) section of the outer annular fan fluid transfer segments and the second (lower) section of the reaction/regeneration annular fan segments are illustrated in FIG. 9 with numerals and letter "B". The mentioned second segments have the same design as the corresponding first segments. As illustrated in FIG. 8, a solid plate 31 is used to separate the first and second portions of the flow distribution segments 17, 17B, the first and second sections of the annular fan segments 19, 19B and the first and second sections of the outer annular fan fluid transfer segments 21, 21B.

The lower rotary device 52B is the same design as the upper rotary device 52 when two stationary inlet/outlet pipes are used. The upper and lower rotary device in FIG. 8 rotate in phase and are connected by a shaft (not shown) going through the center of the stationary flow distribution segments 17 and 17B. For a typical reaction/regeneration process with purges, the process feed enters the inlet channel 1 and exits the outlet channel 1B. The purge fluid enters the inlet channel 2B and the regeneration fluid enters the inlet channel 3B and exits the system through the outlet channels 2 and 3 respectively. The purge fluid is preferable entering the channel between the channels containing regeneration and process feed fluids to minimize the cross leakages between the two fluids. Alternately, the feed may enter through the inlet channel 3B and the regeneration fluid enters through the inlet channel 1.

The first example of the second embodiment is a separation device with adsorbent as filler in both sections of the annular fan segments, for instance, a dehumidifier with silica gel as the filler. The second example of the second embodiment is a chemical reactor with a catalyst as the filler in both sections of the annular fan segments, for instance, a reactor/regenerator with a Catalytic Reforming catalyst as the filler.

For the first and second example of the second embodiment with purge gas and two inlet/outlet stationary pipe, FIG. 8 illustrates that the process feed gas with target component(s) flows into the inlet channel 1 and flows through outer annular of the top stationary pipe 6, seals 7 and 9, rotating flow channel with face plate opening 14 of rotary device 52, the 3 stationary flow distribution segments 17, the intermediate perforated plate/screen 18 before the target component(s) is/are adsorbed/reacted by/with the filler loaded in the 3 annular fan segments 19. The rotary device rotates in a stepwise manner and advances one segment for each time step. As a result, the filler in the first filler bed segment in the adsorption/reaction zone is always freshly regenerated. The filler in the last segment in the adsorption/reaction zone is nearly spent. Process feed stream after the adsorbates removal or reaction in the adsorption/reaction zone flows through the outer plate/screen 20, first and second outer annular fan fluid transfer segments 21, 21B, the second (lower) plate/screen 20B, more adsorbates removal or reaction are performed in the 3 lower annular fan adsorption/reaction bed segments 19B. The effluent flows through the intermediate perforated plate/screen 18B, the 3 lower flow distribution segments 17B, the rotating flow channel of the lower rotary device 52B with the face plate openings 14B. Then, the effluent leaves the system through the stationary pipe 6B and exits at 1B. The purge and hot regeneration fluids enter 2B, 3B and flow counter current to the process feed. The purge fluid enters channel 2B at the intermediate annular of the second concentric pipe 6B, flows through 7B, 9B. The purge fluid flows through the second rotating flow channel of the rotary device 52B and is divided by the two separate face plate openings 15 B as shown in FIG. 3A. The fluid purges the two stationary second flow distribution segments 17B of FIG. 9 and flows through the perforated plate/screen 18B, annular fan adsorbent/catalyst beds 19B which are between the reaction/adsorption and regeneration segments, the perforated plate/screen 20B and the second outer annular fan fluid transfer segments 21B, the first outer annular fan fluid transfer segments 21, the perforated plate/screen 20 and enters the first annular fan adsorbent/catalyst beds 19 which are between the reaction/adsorption and regeneration segments. The purge gas from the two purged annular fan segments enter the two separate first flow distribution segments 17 and subsequently leaves the system through the corresponding face plate openings 15 of the rotating flow channel of the upper rotary device 52, the intermediate annular flow channel of the stationary pipe 6 and exits at 2.

The hot regeneration fluid enters 3B at the center of stationary pipe 6B, flows through 7B, 9B, rotating flow channel of the rotary device 52B before the fluid reaches the face plate opening 16B. The hot regeneration fluid distributed from 3B into the three spent filler segments by aligning the rotary device flow distribution channel opening of 16B in FIG. 3A with the three stationary flow distribution segments 17B in FIG. 9. The hot regeneration fluid from 17B enters the three spent adsorbent bed segments 19B through screen 18B and regenerates the spent filler by heating up or reacting with the filler in the annular fan segments. The adsorbates adsorbed onto the adsorbent in the prior adsorption steps are released or the coke deposited on the catalyst in the prior reaction steps is burn off during the regeneration. Regeneration gas vents through the lower outer perforated plate/screen 20B, the second outer annular fan fluid transfer segments 21B, the first outer annular fan fluid transfer segments 21, the perforated plate/screen 20, and enters the three upper spent filler bed in annular fan segments 19 to regenerate the first filler beds. The regeneration fluid with the desorbed adsorbates or regeneration products leaves the system through the perforated plate/screen 18, the flow distribution segments 17, the rotating flow channel at the center portion of rotary device 52 with face plate opening 16, seals 9, 7 and the flow channel in stationary pipe 6 and exits at 3. 4/4B, 5/5B, 10/10B and 11/11B are the internal walls used to separate the process, purge and regeneration fluids.

The third example of the second embodiment is a portable dehumidifier. It differs from the third example of the first embodiment that the rotary device is between the stationary pipe and the stationary dehumidification/regeneration box instead of passing through the core of the stationary dehumidification/regeneration box. There is no flow distribution box in the second embodiment. The flow distribution segments are at the center of the upper compartment of the stationary dehumidification/regeneration box as shown in FIG. 9. The annular fan sections, outer annular fan fluid transfer sections and the lower compartment of the dehumidification/regeneration box of this example are the same design as that of the third example of the first embodiment.

A variation of the flow distribution segments with divided inner and outer compartments can be used to add feeds or withdraw effluents from the second section of the flow distribution segment. The outer compartment is divided into a first outer portion and a second outer portion below said first outer portion by solid plate. The first outer portion and second outer portion are not communicating with each other directly. Each of the first outer portions and the inner compartments is either isolated from or communicates to only one rotating flow channel. Each of the rotating flow channels communicates to the corresponding first outer portions or the inner compartment but not both. Each of the first outer portions is separated from the inner portion by partition plate and communicates to the corresponding first annular fan segment. Each of the second outer portions communicates with the second annular fan segment and the corresponding second inner portion. The process flow path for the annular fan segments are parallel as examples 1, 2 and 3 if the partition plates has no opening on it. With opening on the partition plates that separate the second outer portion compartments from each other, the flow path for the annular fan segments can turn into the series flow similar to example 4.

The fourth example of the second embodiment illustrates an alternate process flow path inside the reaction/regeneration box using a single stationary inlet/outlet pipe. It differs from the fourth example of the first embodiment that the rotary device is between the stationary pipe and the reaction/regeneration box instead of passing through the core of the reaction/regeneration box. The flow distribution segments in the reaction/regeneration box is divided into a first portion and a second portion below said first portion by the partition plate(s). Each first portion communicates with the corresponding first section and each second portion communicates with the corresponding second section of the annular fan segments. Each of the flow distribution channels communicates with the corresponding first portion(s) and each of the first portions only communicates to one of the rotary device flow distribution channels. The partition plates angularly separating the first portion of the flow distribution segments are the first partition plates and the partition plates angularly separating the second portion of the flow distribution segments are the second partition plates. The first partition plates and second partition plates are classified into A and B groups. The A group does not have any opening. Each of the B group partition plates has at least one opening and is positioned between the partition plates of the A group. The first partition plates and the second partition plates employed for the portion of the flow distribution segments that communicate with the rotating flow channel belong to the A group. Each every other partition plate employed for the first portion and the second portion of the flow distribution segments not communicates with the rotating flow channel belong to the B group. To avoid the process fluids from different rotating flow channels mixing in the adjacent portions of the flow distribution segments, the A group partition plate is used for the partition plate either below or above the partition plate separating the two adjacent portions of flow distribution segments communicating to two rotating flow channels. This example does not have the flow distribution box and the flow distribution segment partition plate openings are not rotate with the rotating flow channels. As a result, the rotary device can not rotate at an angle equal to the rotation of one segment for each time step. Instead of rotating one segment each time, it has to rotate several segments for each time step and the degree of rotation depends on the symmetry of the flow distribution segment. For the case with the first portions of the flow distribution segments identical to FIG. 10B and the second portions of the flow distribution segments identical to FIG. 10C, the feed flow path is 180 degree mirror image to the regeneration fluid flow path and the rotary device rotates 180 degrees or 4 segments each time. More operation details of examples of the first and second embodiment are discussed below.

The operation conditions of the examples 1, 3 and 4 are the same for the first and second embodiment. The filler in the annular fan segments of the reaction/regeneration box is silica gel with particle size from 1 mm to 8 mm. The regeneration gas operating temperature is limited to less than 200° C.

The second example for the first and second embodiment involved the use of the continuous reaction/regeneration apparatus for the reaction and regeneration of the hydrocarbon conversion catalyst comprising a group VIII noble metal component and a halogen component in combination with a refractory inorganic oxide carrier material. The catalyst is deactivated by the deposition of carbonaceous material (coke) and loss of halogen. The feed 1 of FIG. 1 is a hydrocarbon stream and the purge fluid is an inert gas such as nitrogen. The feed 2 composition changes with time. It contains oxygen and the same type of halogen on the catalyst during coke burning and halogen addition. It contains hydrogen when the reduction of the oxidized catalyst is required. The catalyst in each of the annular fan segments goes through hydrocarbon conversion, purge 1, regeneration and purge 2 steps in sequence for each cycle. Instead of 8 segments in the prior illustrated example, 40 equal angular segments are preferable than 8 segments for the catalyst with low coking rate. The number of reaction segments increases from 3 to 35, 2 segments are used for purging and 3 segments are used for regeneration. The reaction pressure is controlled at 3.5 kg/cm$^2$(a) with maximum of 22 kg/cm$^2$ (a). The hydrocarbon feed temperature is controlled between 482 and 538° C. The regeneration feed and purge temperature are controlled between 454 and 538° C. The carbonaceous deposition and the loss of halogen component on the catalyst happen during the hydrocarbon conversion step which lead to the catalyst deactivation. The purge 1 step removes the hydrocarbons feed left in the segments before the oxygen containing regeneration gas is in contact with the deactivated catalyst during the regeneration step. The regeneration step is divided into four periods with the first period for coke burning and the second period for adding halogen and reconditioning of the catalyst. The third period of the regeneration step is for the nitrogen purging to remove the oxygen and H$_2$O, and the fourth period is for the reduction of the catalyst. At the completion of the regeneration step, the purge fluid in purge 2 step removes the moisture in the segments before the hydrocarbon is sent back to the segments for reaction. The purge fluid channels are between the reaction and regeneration channels to prevent the cross contamination of the fluids in the reaction and regeneration channels. The pressure of the purge gas fluid channels is preferable kept at more than 150 mm H$_2$O higher than the reaction channel. The reaction channel pressure is preferably kept at more than 150 mm higher than the regeneration channel when the regeneration channel contains oxygen, but is kept preferably the same as the regeneration channel when the regeneration channel contains hydrogen. The oxygen concentration in the regeneration fluid is kept at less than the limiting oxygen concentration (LOC) and is preferably kept at less than 60% of the LOC. The purity of the hydrogen is kept above 70%. The cycle time for one full rotation of the rotary device is controlled such that the carbonaceous material build up on the catalyst is preferably less than 3 wt % and with a maximum of 15 wt % of the catalyst.

Obviously many modifications and variations are possible in light of the above teachings. It is therefore understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A radial-flow continuous reaction/regeneration apparatus comprising:
a first stationary pipe with a plurality of first inlet/outlet channels;
a rotary device connected to the first stationary pipe, wherein the rotary device comprises a plurality of first flow distribution channels employed to individually receive/transfer fluid(s) from/to the first inlet/outlet channels, and a plurality of second flow distribution channels;
a stationary reaction/regeneration box communicates with the rotary device, wherein the stationary reaction/regeneration box comprises a plurality of flow distribution segments, a plurality of annular fan segments, and a plurality of outer annular fan fluid transfer segments, wherein the flow distribution segments communicate with the rotary device, wherein each of the flow distribution segments is isolated from each other and divided into a first portion and a second portion below said first portion, wherein each of the first flow distribution channels communicates with the corresponding first portion(s) and each of the first portion only communicates to one of the first flow distribution channels, wherein each of the second flow distribution channels communicates with the corresponding second portion(s) and each of the second portion only communicates to one of the second flow distribution channels, wherein the annular fan segments are outside to the flow distribution segments, wherein each of the annular fan segments is isolated from each other and divided into a first section and a second section below said first section, wherein each first section communicates with the corresponding first portion and each second section communicates with the corresponding second portion of the flow distribution segments, wherein the outer annular fan fluid transfer segments are outside to the annular fan segments, wherein each of the outer annular fan fluid transfer segments is isolated from each other, wherein each first section communicates with the corresponding second section through the corresponding outer annular fan fluid transfer segment; and
a second stationary pipe communicates with the rotary device, wherein the second stationary pipe comprises a plurality of second outlet/inlet channels employed to individually receive/transfer fluid from/to the second flow distribution channels of the rotary device.

2. The radial-flow continuous reaction/regeneration apparatus according to claim 1, wherein the first inlet/outlet channels and the second inlet/outlet channels are concentric.

3. The radial-flow continuous reaction/regeneration apparatus according to claim 1, wherein at least one of the first section and the second section of each of the annular fan segments is filled with filler, wherein the filler is selected from the following: solid particle, structure packing, gel, polymer fiber.

4. The radial-flow continuous reaction/regeneration apparatus according to claim 1, wherein the stationary reaction/regeneration box further comprises a minimum of two set of porous elements, wherein the two set of porous elements comprise a plurality of inner porous elements and a plurality of outer porous elements, wherein each of the inner porous elements is positioned between the flow distribution segment and the corresponding annular fan segment, wherein each of the outer porous elements is positioned between the annular fan segment and the corresponding outer annular fan fluid transfer segment, wherein the inner porous elements and the outer porous elements are individually selected from the group of: screen, perforated plate, wherein the stationary reaction/regeneration box further comprises a plurality of partition plates employed to angularly separate the flow distribution segments from each other, to angularly separate the annular fan segments from each other, and to angularly separate the outer annular fan fluid transfer segments from each other.

5. The radial-flow continuous reaction/regeneration apparatus according to claim 1, wherein the rotary device is passing through the core of the stationary reaction/regeneration box.

6. The radial-flow continuous reaction/regeneration apparatus according to claim 1, wherein the first flow distribution channels comprise the first rotating flow channels with a first face plate openings and a first flow distribution box, and the second flow distribution channels comprise the second rotating flow channels with a second face plate openings and a second flow distribution box, wherein the first face plate openings is positioned between the first stationary pipe and the first flow distribution box, and the second face plate openings is positioned between the second stationary pipe and the second flow distribution box.

7. The radial-flow continuous reaction/regeneration apparatus according to claim 6, wherein the first flow distribution box of the rotary device comprises a plurality of first partition plates employed to angularly divide the first flow distribution box into a plurality of first flow distribution compartments corresponding to the first flow distribution segments of the stationary reaction/regeneration box, wherein the first partition plates have no opening and the adjacent first flow distribution compartments are isolated from each other, wherein the second flow distribution box of the rotary device comprises a plurality of second partition plates employed to angularly divide the second flow distribution box into a plurality of second flow distribution compartments corresponding to the second flow distribution segments of the stationary reaction/regeneration box, wherein the second partition plates have no opening and the adjacent second flow distribution compartments are isolated from each other.

8. The radial-flow continuous reaction/regeneration apparatus according to claim 6, wherein both the first flow distribution box and the second flow distribution box of the rotary device comprise a plurality of first partition plates and a plurality of second partition plates employed to angularly divide the first flow distribution box and the second flow distribution box into a plurality of first flow distribution compartments corresponding to the first flow distribution segments of the stationary reaction/regeneration box and a plurality of second flow distribution compartments corresponding to the second flow distribution segments of the stationary reaction/regeneration box, wherein the first partition plates and the second partition plates are classified into A group and B group, wherein each of the partition plates of the A group do not have any opening, wherein each of the partition plates of the B group has at least one opening and is positioned between the partition plates of the A group, wherein each of the first partition plates and the second partition plates employed for the flow distribution compartments that communicate with the rotating flow channel belong to the A group, wherein each every other partition plate employed for the first and the second flow distribution compartments not communicates with the rotating flow channel belong to the B group, wherein the partition plate either below or above the partition plate separating the two adjacent flow distribution compartments communicating to two rotating flow channels belongs to the A group.

9. The radial-flow continuous reaction/regeneration apparatus according to claim 1, wherein the first flow distribution channel comprises a first rotary part and the second flow distribution channel comprises a second rotary part, wherein the first rotary part is between the first stationary pipe and the stationary reaction/regeneration box and the second rotary part is between the stationary reaction/regeneration box and the second stationary pipe.

10. The radial-flow continuous reaction/regeneration apparatus according to claim 4, wherein the partition plates employed to angularly separate the flow distribution segments from each other, to angularly separate the annular fan segments from each other and to angularly separate the outer annular fan fluid transfer segments from each other is solid plate and with no opening.

11. The radial-flow continuous reaction/regeneration apparatus according to claim 4, wherein the partition plates which separate the flow distribution segments from each other can be further classified into first partition plates that separate the first portions and second partition plates that separate second portions, wherein the first partition plates and the second partition plates are classified into A group and B group, wherein each of the partition plates of the A group do not have any opening, wherein each of the partition plates of the B group has at least one opening within the flow distribution segment and is positioned between the partition plates of the A group, wherein the first partition plates and the second partition plates employed for the flow distribution segments that communicates with the rotating flow channel are the partition plates of the A group, wherein each every other partition plate employed for the first portions and the second portions of the flow distribution segments not communicates with the rotating flow channel is belong to the partition plates of the B group, wherein the partition plate either below or above the partition plate separating the two adjacent portions of flow distribution segments communicating to two rotating flow channels belongs to the A group.

12. The radial-flow continuous reaction/regeneration apparatus according to claim 9, wherein the first rotary part comprises a plurality of first rotating flow channels with the first face plate openings, wherein the second rotary part comprises a plurality of second rotating flow channels with the second face plate openings.

13. The radial-flow continuous reaction/regeneration apparatus according to claim 1, further comprising a plurality of first group seals, second group seals, and third group seals, wherein the first group seals are between the first stationary pipe and the rotary device, wherein the second group seals are between the rotary device and the second stationary pipe, wherein the third group seals are between the rotary device and the stationary reaction/regeneration box.

14. A radial-flow continuous reaction/regeneration apparatus comprising:
a stationary pipe with a plurality of inlet/outlet channels;
a rotary device connected to the stationary pipe, wherein the rotary device comprises a plurality of flow distribution channels employed to individually receive/transfer fluid(s) from/to the inlet/outlet channels; and
a stationary reaction/regeneration box communicates with the rotary device, wherein the stationary reaction/regeneration box comprises a plurality of flow distribution segments, a plurality of annular fan segments, and a plurality of outer annular fan fluid transfer segments, wherein the flow distribution segments communicate with the rotary device, wherein each of the flow distribution segments is isolated from each other, wherein each of the flow distribution channels communicates with the corresponding flow distribution segment(s) and each the flow distribution segment communicates only to one of the flow distribution channels, wherein the annular fan segments are outside to the flow distribution segments, wherein each of the annular fan segments is isolated from each other and divided into a first section and a second section below said first section, wherein each first section communicates with the corresponding flow distribution segment, wherein the outer annular fan fluid transfer segments are outside to the annular fan segments, wherein each of the outer annular fan fluid transfer segments is isolated from each other, wherein each first section communicates with the corresponding second section through the corresponding outer annular fan fluid transfer segment.

15. The radial-flow continuous reaction/regeneration apparatus according to claim 14, wherein the inlet/outlet channels are concentric.

16. The radial-flow continuous reaction/regeneration apparatus according to claim 14, wherein the stationary reaction/regeneration box further comprises a minimum of two set of porous elements, wherein the two set of porous elements comprise a plurality of inner porous elements and a plurality of outer porous elements, wherein each of the inner porous elements is positioned between the flow distribution segment and the corresponding annular fan segment, wherein each of the outer porous elements is positioned between the annular fan segment and the corresponding outer annular fan fluid transfer segment, wherein the inner porous elements and the outer porous elements are individually selected from the group of: screen, perforated plate, wherein the reaction/regeneration box further comprises a plurality of partition plates employed to angularly separate the flow distribution segments from each other, to angularly separate the annular fan segments from each other, and to angularly separate the outer annular fan fluid transfer segments from each other.

17. The radial-flow continuous reaction/regeneration apparatus according to claim 14, wherein the rotary device is inserting into the core of the stationary reaction/regeneration box, wherein the flow distribution segments in the stationary reaction/regeneration box is divided into a first portion and a second portion below said first portion, wherein each first portion communicates with the corresponding first section of the annular fan segments and each second portion communicates with the corresponding second section of the annular fan segments.

18. The radial-flow continuous reaction/regeneration apparatus according to claim 14, wherein the flow distribution channels of the rotary device further comprises rotating flow channels with face plate openings and a flow distribution box, wherein the face plate with openings is positioned between the stationary pipe and the flow distribution box, wherein the flow distribution box further comprises a plurality of partition plates employed angularly divide the flow distribution box into a plurality of flow channel compartments corresponding to the flow distribution segments of the stationary reaction/regeneration box.

19. The radial-flow continuous reaction/regeneration apparatus according to claim 18, wherein each flow channel compartment is divided into inner compartment and outer compartment, wherein each of the outer compartment is divided into a first outer portion and a second outer portion below said first outer portion, wherein the first outer portion and the second outer portion are isolated by the partition plate, wherein each of the first outer portions communicates to no more than one rotating flow channel and each of the inner compartments communicates to no more than one rotating flow channel, wherein each of the rotating flow channels communicates to the flow channel compartment according to the face plate opening position but not both the inner compartment and the outer compartment of the same flow channel compartment, wherein the first outer portions are separated from the inner compartments by the partition plates and each of the second outer portion is communicating with the corresponding inner compartment, wherein each of the first outer portions is communicating to the corresponding first portion of the flow distribution segment and the each of the second outer portions is communicating with the corresponding second portion of the flow distribution segment.

20. The radial-flow continuous reaction/regeneration apparatus according to claim 18, wherein each of the flow channel compartment is divided into a first portion and a second portion below said first portion, wherein each of the first portion of the flow channel compartments communicates with the corresponding first portion of the flow distribution segment, wherein each of the second portion of the flow channel compartments communicates with the corresponding second portion of the flow distribution segment, wherein the first partition plates are employed angularly to separate the first portions of the flow channel compartments from each other and the second partition plates are employed angularly to separate the second portions of the flow channel compartments from each other, wherein the first partition plates and the second partition plates are classified into A group and B group, wherein each of the partition plates of the A group do not have any opening, wherein each of the partition plates of the B group has at least one opening and is positioned between the partition plates of the A group, wherein each of the first partition plates and the second partition plates employed for the portion of the flow channel compartments that communicate with the rotating flow channel belong to the A group, wherein each every other partition plate employed for the first portion and the second portion of the flow channel compartments not communicates with the rotating flow channel belong to the B group, wherein the partition plate either below or above the partition plate separating the two adjacent portions of flow channel compartments communicating to two rotating flow channels belongs to the A group.

21. The radial-flow continuous reaction/regeneration apparatus according to claim 14, wherein the rotary device is situated between the stationary pipe and the stationary reaction/regeneration box.

22. The radial-flow continuous reaction/regeneration apparatus according to claim 14, wherein the flow distribution channels of the rotary device comprise a plurality of rotating flow channels with face plate openings, wherein the rotating flow channels with face plate openings are positioned between the stationary pipe and the flow distribution segments.

23. The radial-flow continuous reaction/regeneration apparatus according to claim 16, wherein the flow distribution segments in the stationary reaction/regeneration box is divided into inner compartments and outer compartments, wherein each of the outer compartment is divided into a first outer portion and a second outer portion below said first outer portion, wherein the first outer portion and the second outer portion are separated by the partition plate, wherein each of the first outer portions communicates no more than one rotating flow channel and each of the inner compartments communicates to no more than one rotating flow channel, wherein each of the rotating flow channels communicates to the compartment(s) of the flow distribution segment(s) according to the opening positions of the face plate opening, wherein the inner compartment and the outer compartment of the same flow distribution segment not communicates to the same rotating flow channel, wherein the first outer portions are separated from the inner portion by partition plate and each of the second outer portion is communicating with the corresponding inner portion, wherein the first outer portion is communicating to the corresponding first section of the annular fan segment and the second outer portion is communicating with the second section of the annular fan segment.

24. The radial-flow continuous reaction/regeneration apparatus according to claim 16, wherein each of the flow distribution segments in the stationary reaction/regeneration box is divided into a first portion and a second portion below said first portion, wherein the first portion and the second portion are separated from each other, wherein each first portion communicates with the corresponding first section and each second portion communicates with the corresponding second section of the annular fan segments, wherein each of the rotating flow channels communicates with the first portion(s) according to the opening positions of face plate opening and each of the first portion only communicates to one of the rotating flow channels, wherein the first partition plates are employed angularly to separate the first portions from each other and the second partition plates are employed angularly to separate the second portions from each other, wherein the first partition plates and the second partition plates are classified into A group and B group, wherein each of the partition plates of the A group do not have any opening, wherein each of the partition plates of the B group has at least one opening and is positioned between the partition plates of the A group, wherein each of the first partition plates and the second partition plates employed for the portion of the flow distribution segments that communicate with the rotating flow channel belong to the A group, wherein each every other partition plate employed for the first portion and the second portion of the flow distribution segments not communicates with the rotating flow channel belong to the B group, wherein the partition plate either below or above the partition plate separating the two adjacent portions of flow distribution segments communicating to two rotating flow channels belongs to the A group.

25. The radial-flow continuous reaction/regeneration apparatus according to claim 14, further comprising two groups of seals, wherein the first group of seals are between the stationary pipe and the rotary device, wherein the second groups of seals are between the rotary device and the stationary reaction/regeneration box.

26. The radial-flow continuous reaction/regeneration apparatus according to claim 14, wherein at least one of the first section and the second section of each of the annular fan segments is filled with filler, wherein the filler is selected from the following: solid particle, structure packing, gel, polymer fiber.

27. The radial-flow continuous reaction/regeneration apparatus according to claim 14, wherein each of the first sections of the annular fan segments is filled with desiccant, wherein each of the second sections comprises at least one condensing coil, wherein the radial-flow continuous reaction/regeneration apparatus further comprises at least one drain, wherein the drain(s) is/are positioned at the lower point(s) of the stationary dehumidification/regeneration box, wherein the mentioned lower point(s) is/are located nearby the condensing coil(s).

28. The radial-flow continuous reaction/regeneration apparatus according to claim 27, further comprising an air inlet for introducing air to be dehumidified into the stationary dehumidification/regeneration box, wherein the air inlet is positioned at the same side with the condensing coils of the stationary dehumidification/regeneration box, wherein the mentioned side is opposite to the stationary pipe.

* * * * *